United States Patent
Sambhwani et al.

(10) Patent No.: US 8,289,866 B2
(45) Date of Patent: Oct. 16, 2012

(54) FLEXIBLE POWER OFFSET ASSIGNMENTS FOR ACQUISITION INDICATOR CHANNELS

(75) Inventors: Sharad Deepak Sambhwani, San Diego, CA (US); Wei Zeng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 12/414,494

(22) Filed: Mar. 30, 2009

(65) Prior Publication Data
US 2009/0252052 A1    Oct. 8, 2009

Related U.S. Application Data

(60) Provisional application No. 61/040,802, filed on Mar. 31, 2008.

(51) Int. Cl.
*H04W 4/00*    (2009.01)
(52) U.S. Cl. ............... 370/252; 370/254; 370/329
(58) Field of Classification Search ............ 455/455, 455/450, 515, 522
See application file for complete search history.

(56) References Cited

U.S. PATENT DOCUMENTS

| | | | | |
|---|---|---|---|---|
| 5,093,840 | A * | 3/1992 | Schilling | 375/130 |
| 7,590,095 | B2 * | 9/2009 | Chen et al. | 370/335 |
| 2001/0040880 | A1 * | 11/2001 | Chen et al. | 370/337 |
| 2009/0196230 | A1 * | 8/2009 | Kim et al. | 370/328 |

FOREIGN PATENT DOCUMENTS

| | | |
|---|---|---|
| KR | 20020073539 | 9/2002 |
| RU | 2267222 | 12/2005 |
| WO | WO2004030392 | 4/2004 |
| WO | WO2004100565 | 11/2004 |
| WO | WO 2006/016775 A2 | 2/2006 |

OTHER PUBLICATIONS

3GPP Draft; 25331-670, 3rd Generation Partnership Project (SGPP), Mobile Competence Centre ; 650, Route Deslucioles ; F-06921 Sophia-Antipolis Cedex ; France, vol. RAN WG2, No. Cannes, France; 20051010, Oct. 11, 2005, XP050129446 p. 565, paragraph 10.3.6.3.

(Continued)

*Primary Examiner* — Yemane Mesfin
*Assistant Examiner* — Mon Cheri Davenport
(74) *Attorney, Agent, or Firm* — D. Scott Juneau

(57) ABSTRACT

A method for wireless communications is provided. The method includes generating at least one adjustable power parameter for an acquisition indicator channel (AICH) and generating at least one adjustable power parameter for an extended acquisition indicator channel (E-AICH). The method also includes generating at least one power offset representing differences between the AICH and the E-AICH.

43 Claims, 21 Drawing Sheets

OTHER PUBLICATIONS

International Search Report and Written Opinion—PCT/US2009/039005, International Search Authority—European Patent Office—Aug. 31, 2009.

NEC: "Value range for E-RGCH power offset and E-HICH power offset" 3GPP. Draft; R3-060607-RGCHHICH-POWEROFFSET-CR-REL7-254 33, 3rd Generation Partnership Project (3GPP), Mobile Competence Centre ; 650, Route Des Lucioles ; F-06921 Sophia-Antipolis Cedex ; France, vol . RAN WG5, No. Shanghai, China; 20060508, May 3, 2006, XP050159543.

Schulist M, et al., "Link level performance , results for a WCDMA random access scheme with preamble power ramping and fast acquisition indication" Vehicular Technology Conference, 1999. VTC 1999—Fall. IEEE VTS 50th.

Amsterdam, Netherlands Sep. 19-22, 1999, Piscataway, NJ, USA,IEEE, US, vol. 5, Sep. 19, 1999, pp. 2581-2585, XP010353371 ISBN: 978-0-7803-5435-7 the whole document.

3GPP TSG-RAN WG1, "Link Analysis of AICH/E-AICH based E-DCH resource allocation scheme," No. 52, R1-080808, Feb. 11th-14th, 2008, pp. 1-20.

Taiwan Search Report—TW098110714—TIPO—Mar. 22, 2012.

* cited by examiner

FLEXIBLE POWER OFFSET ASSIGNMENTS FOR ACQUISITION INDICATOR CHANNELS

CLAIM OF PRIORITY UNDER 35 U.S.C. §119

This application claims the benefit of U.S. Provisional Patent Application No. 61/040,802, entitled FLEXIBLE POWER SETTING ON THE AICH AND E-AICH BITS FOR THE PURPOSE OF RELIABLE E-DCH RESOURCE ALLOCATION, and filed on Mar. 31, 2008, the entirety of which is incorporated herein by reference.

BACKGROUND

I. Field

The following description relates generally to wireless communications systems, and more particularly to generation and communication of adjustable power offset parameters for acquisition indicator channels (AICH) and extended AICH (E-AICH).

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Generally, each of the NS independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

An Acquisition Indicator channel (AICH) is a fixed rate (SF=256) physical channel employed to carry Acquisition Indicators (AI). Acquisition Indicators (AIs) correspond to signatures on a Physical Random Access Channel (PRACH). In existing systems, power parameters for AICH are set and processed as constant value within the system. Also, conventional systems do not consider processing for enhanced channels such as Enhanced or Extended AICH (E-AICH) which may also need to process power parameters in a different manner than existing AICH processors.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods are provided for generation and communication of adjustable power offset parameters for acquisition indicator channels (AICH) and extended AICH (E-AICH). The power offsets can be communicated as flexible parameters from a radio network controller (RNC) to base stations and/or user equipment to signal power offset differences between AICH and E-AICH channels, respectively. In previous systems, AICH processed fixed power signals that were non-adjustable. In one aspect, flexible parameters are provided for AICH channels and for E-AICH channels, respectively. Such parameters can also be suitably adjusted in view of desired noise parameters/performance that may be detected or set within a wireless communications network in order to optimize performance of the network. In another aspect, existing AICH processing architectures can be adapted to also process adjustable E-AICH power offset parameters.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

FIGS. 12-15 illustrate example AICH and E-AICH channel components.

DETAILED DESCRIPTION

Systems and methods are provided to dynamically generate and manage network addresses for mobile wireless applications. In one aspect, a method for wireless communications is provided. The method includes employing a processor executing computer executable instructions stored on a computer readable storage medium to implement various acts. This includes generating at least one adjustable power parameter for an acquisition indicator channel (AICH) and generating at least one adjustable power parameter for an extended acquisition indicator channel (E-AICH). The method also includes generating at least one power offset representing differences between the AICH and the E-AICH.

Figure 1:
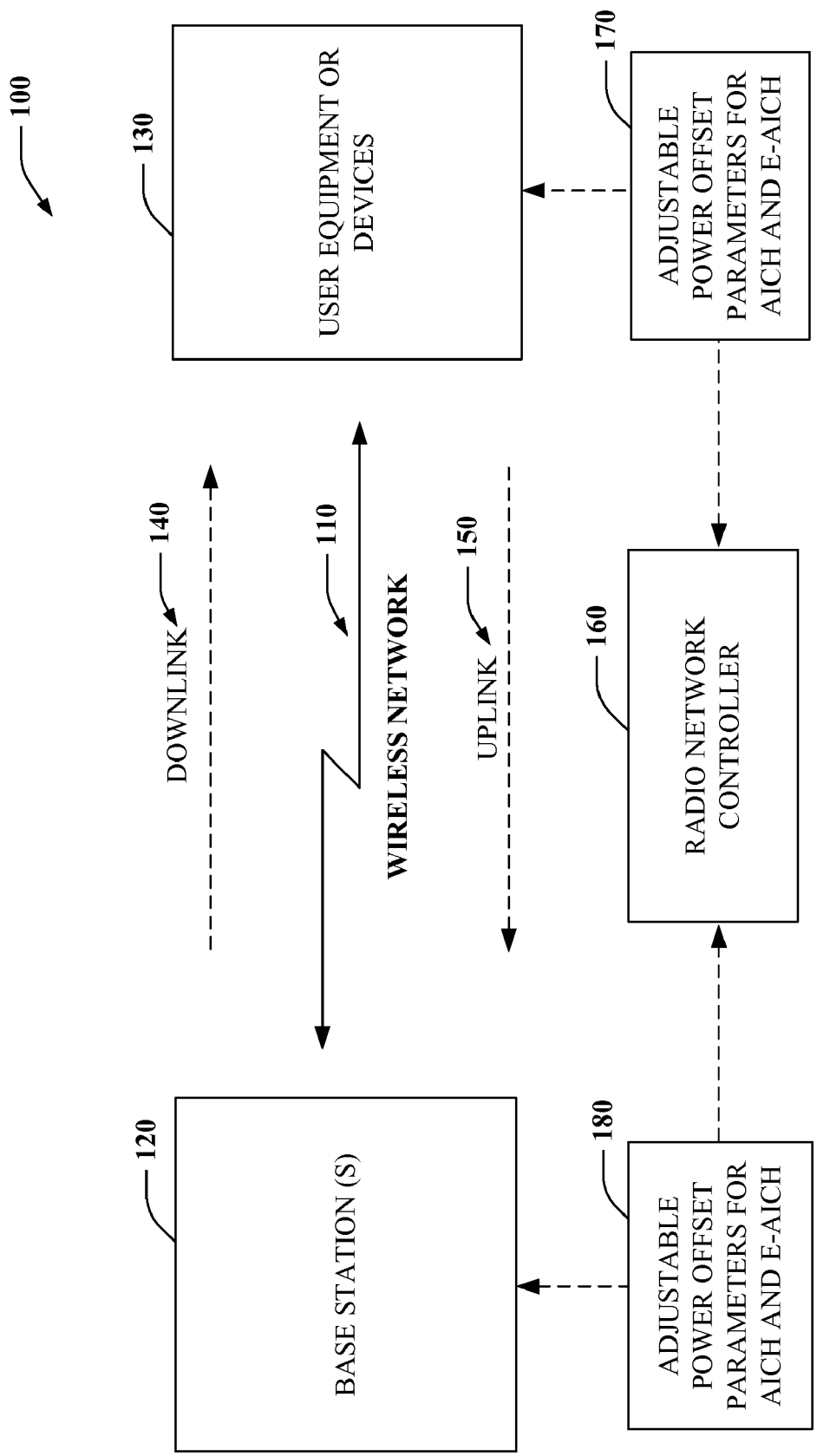
FIG. 1 is a high level block diagram of a system that flexible power offset parameters for AICH and E_AICH channels in a wireless communications environment.

Referring now to FIG. 1, a system 100 employs flexible power offset parameters for acquisition indicator channels (AICH) and Extended AICH (E_AICH) channels in a wireless communications environment. The system 100 includes one or more base stations 120 (also referred to as a node, evolved node B-eNB, femto station, pico station, and so forth) which can be an entity capable of communication over a wireless network 110 to a second device 130 (or devices). For instance, each device 130 can be an access terminal (also referred to as terminal, user equipment, mobility management entity (MME) or mobile device). The base station 120 communicates to the device 130 via downlink 140 and receives data via uplink 150. Such designation as uplink and downlink is arbitrary as the device 130 can also transmit data via downlink and receive data via uplink channels. It is noted that although two components 120 and 130 are shown, that more than two components can be employed on the network 110, where such additional components can also be adapted for the wireless protocols described herein. As shown, a radio network controller (RNC) 160 generates and/or communicates adjustable power offset parameters 170, 180 to the base station 120 and/or user equipment 130. It is noted that the RNC 160 can be a separate node on the wireless network 110. The RNC 160 could also be incorporated in one or more other devices. For example, the RNC could be incorporated in the base station 120 and/or in the user equipment 130.

In one aspect, the system 100 provides for generation and/or communication of adjustable power offset parameters 170, 180 for acquisition indicator channels (AICH) and extended AICH (E-AICH). The power offsets 170 and/or 180 can be communicated as flexible parameters from the radio network controller (RNC) to base stations 120 and/or user equipment 130 to signal power offset differences between AICH and E-AICH channels, respectively. In previous systems, AICH processed fixed power signals that were non-adjustable. In one aspect, flexible parameters 170, 180 are provided for AICH channels and for E-AICH channels respectively. Such parameters can also be suitably adjusted in view of desired noise parameters/performance (described below with respect to FIGS. 2-4) that may be detected or set within a wireless communications network 110 in order to optimize performance of the network. In another aspect, existing AICH processing architectures can be adapted to also process adjustable E-AICH power offset parameters. Example AICH and E-AICH channels are described in more detail below with respect to FIGS. 12-15.

In one aspect, an extended or enhanced dedicated channel (E-DCH) resource allocation process is provided. The process can be referred to as the AICH/E-AICH E-DCH Resource Allocation. The process can involve using existing AICH channels to communicate default E-DCH resource (e.g., one to one mapping between access preamble and default E-DCH resource). If the default E-DCH resource is blocked, the NodeB can communicate an E-DCH resource using an expanded set of up to 16 AICH signatures. A total of 32 values can be sent in this expanded space, by allowing for a +1 or −1 to be sent on e.g., 1 AICH signature (see discussion and FIGS. 12-15 below).

The sensitivity of the error performance of the AICH/E-AICH E-DCH Resource Allocation can be considered for optimization of the power offset parameters 170, 180 to the fraction of power α allocated on the AICH and the remaining power (1−α), allocated on the E-AICH.

The AICH/E-AICH E-DCH Resource Allocation process and an example AICH/E-AICH detector algorithm can include:

A UE transmits a randomly chosen access preamble signature.

The access preambles are one to one mapped to AI bits that modulate the AICH signature sequences.

The AI bits corresponding to the access preambles are in turn one to one mapped to E-DCH resource configurations. These resources can be referred to as default resource configurations.

If the NodeB detects the access preamble and the corresponding default E-DCH resource configuration is available, the NodeB sends a +1 on the corresponding AI bit. This indicates to the UE 130, that the default E-DCH resource configuration index is allocated to the UE.

If the default resource configuration is not available, the Node B 120 can send a −1 on the AI bit corresponding to the access preamble.

The NodeB then allocates another E-DCH resource configuration to the UE using the AI bits that modulate the extended lower half of AICH (there are 16 signatures available) signature pattern table. The allocation can be as follows:

Transmit one of the 16 available AICH signatures in the expanded space, and use the INDEX of this signature to indicate the E-DCH resource.

Node B can transmit either +1 or −1 on each E-AICH signature

The E-AICH signature and the sign of the bit sent on the E-AICH signature represents a unique value.

With 16 E-AICH signatures, there are 32 values, for example.

One of the values is reserved for actual NACK

In general, the UE correlates the de-spread symbols with the 16 possible AICH signatures and then selects the correlator output with the largest "magnitude".

To decide between +1 or −1 on the AI bit corresponding to the AICH signature with largest magnitude, the UE then obtains the sign of the correlator output.

Generally, no erasure logic was assumed in the receiver algorithm.

The value is then translated to the E-DCH resource configuration by adding the value to the default E-DCH resource configuration index modulo the number of E-DCH resource configurations. As can be appreciated, other AICH, E-AICH, or E-DCH algorithms or processing can be provided. Before proceeding, it is noted that FIGS. 2-4 described example error/performance processing considerations for setting flexible offset parameters.

It is further noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
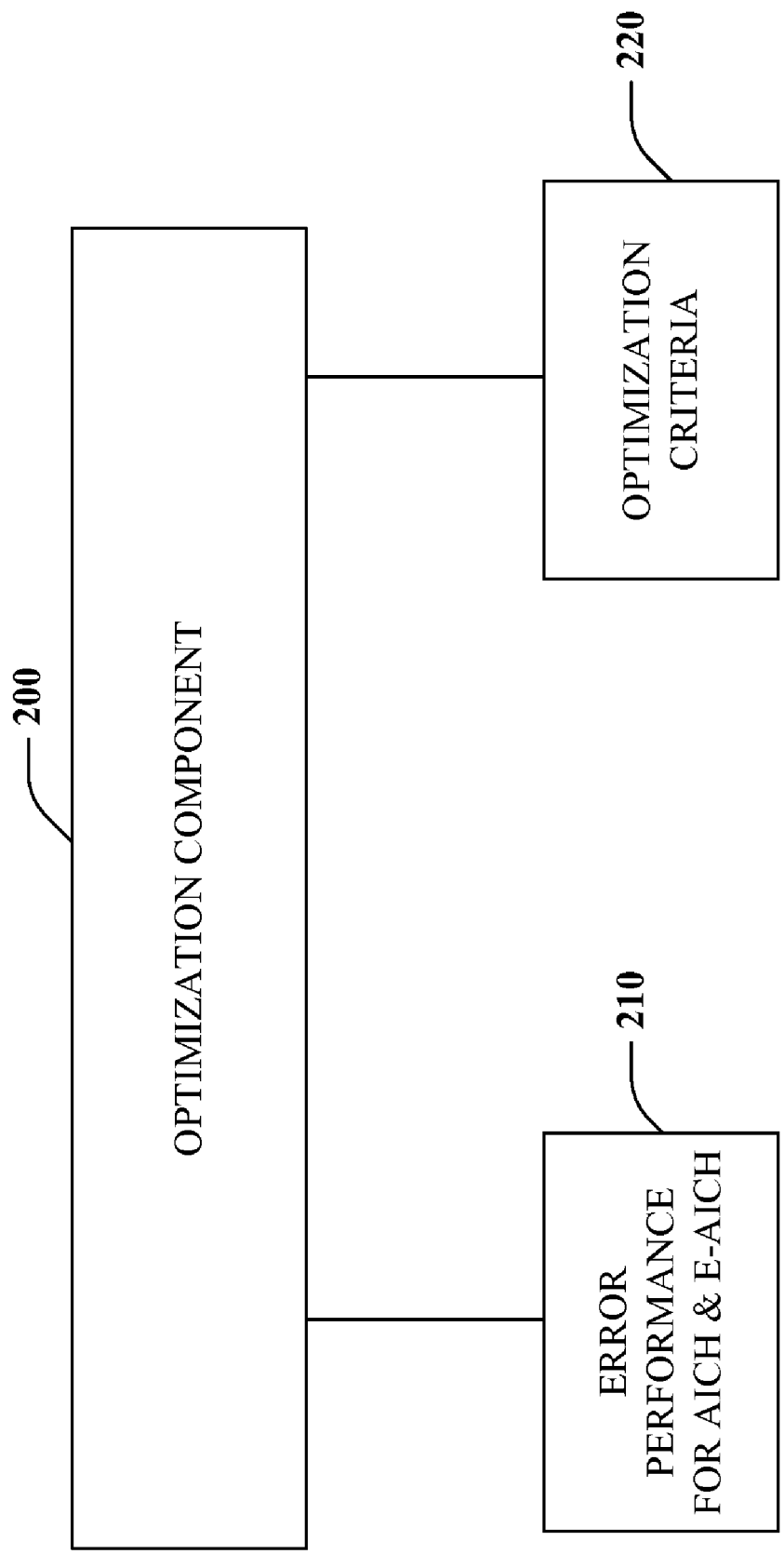
FIGS. 2-4 illustrate error and performance considerations for dynamic settings of flexible power offset parameters.
Figure 3:
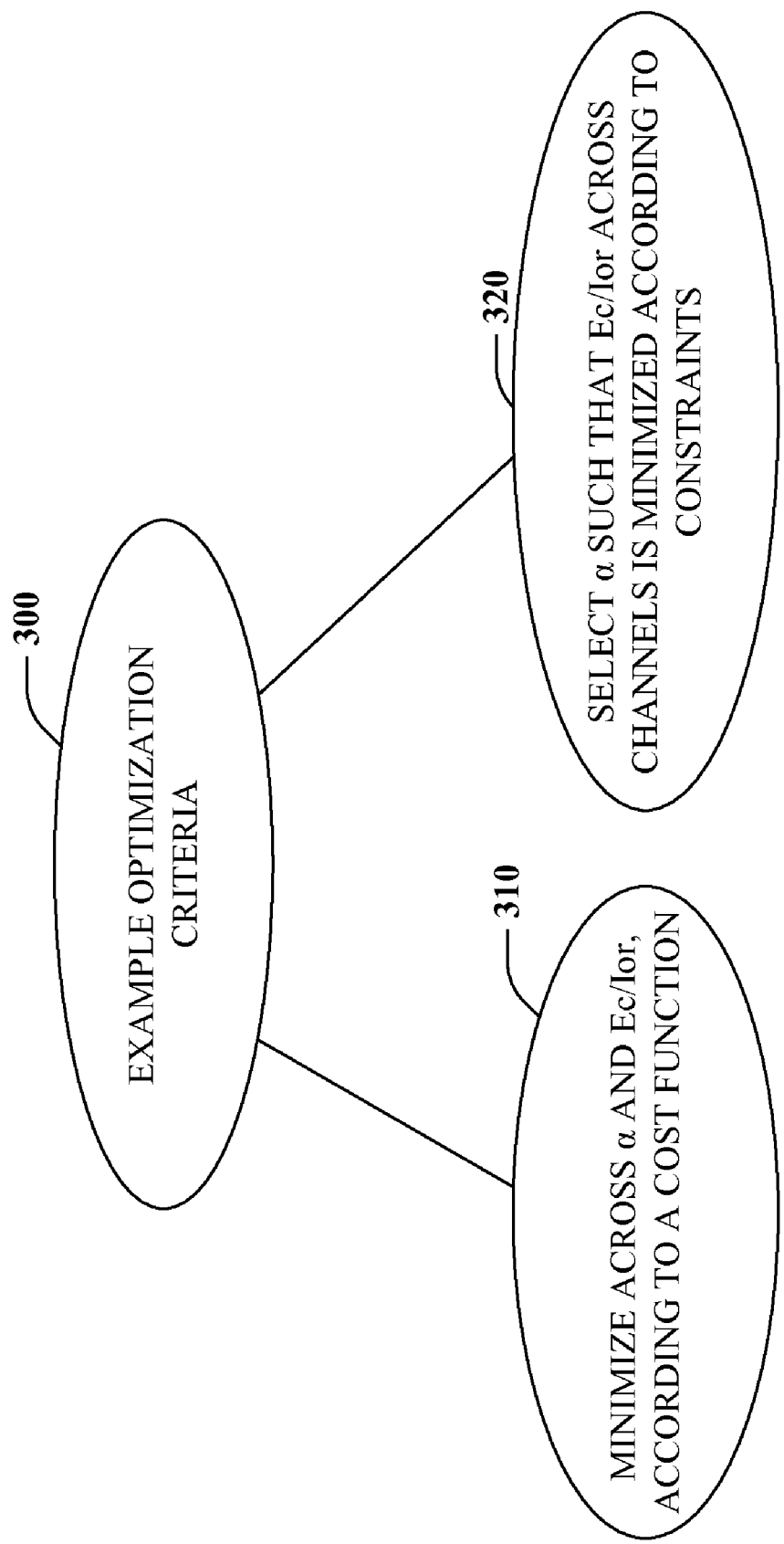
Figure 4:
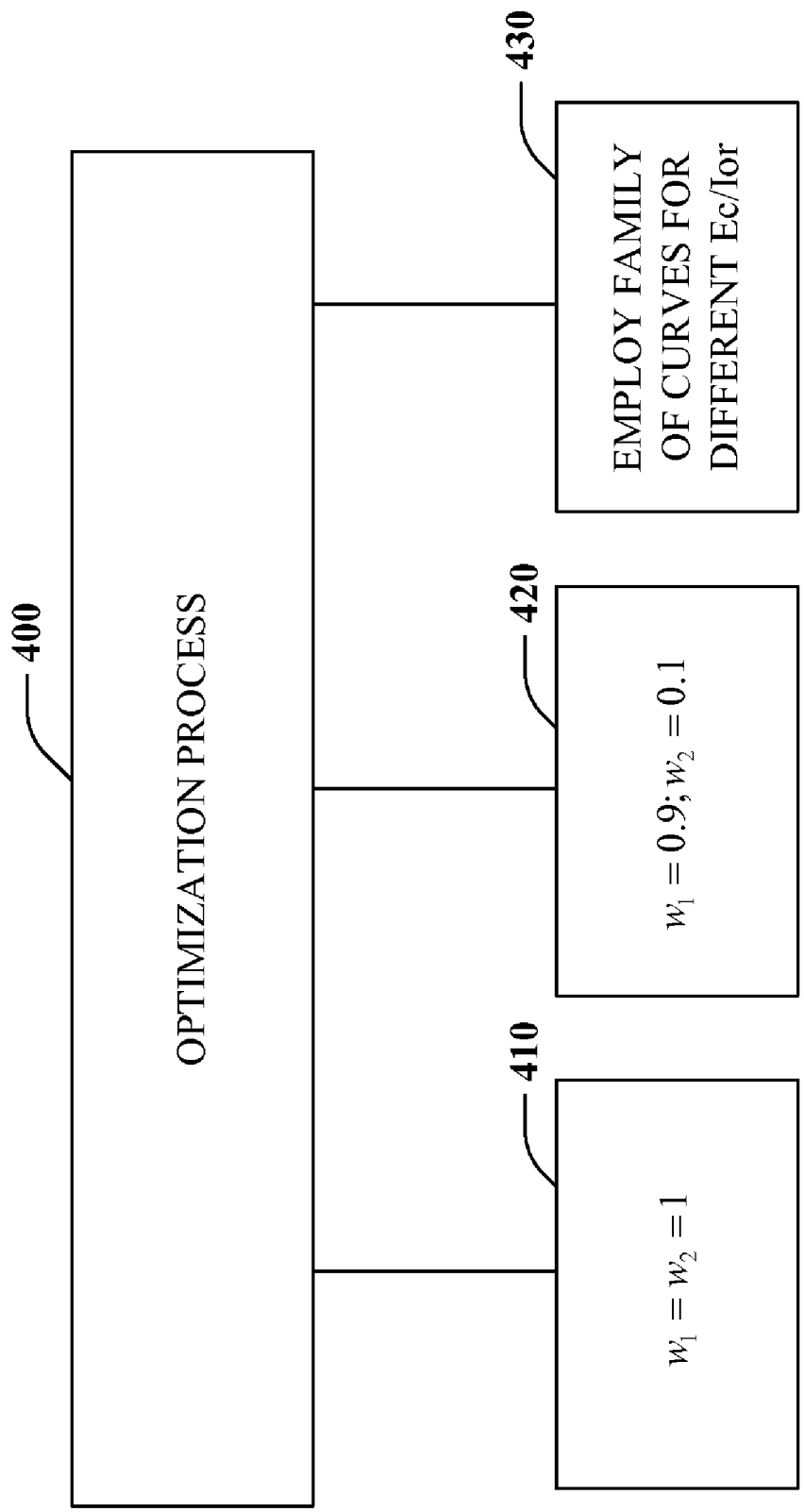

FIGS. 2-4 illustrate error and performance considerations for dynamic settings of flexible power offset parameters. Referring now to FIG. 2, an optimization component 200 is provided that considers error performance 210 of AICH/E-AICH and optimization criteria 220 for the respective channels.

At 210 of FIG. 2, the error of the AICH/E-AICH process corresponding to the UE decoding algorithm as noted above can include:

Part 1 decision error: this error corresponds to the threshold decision error in the existing AICH space.

Part 2 decision error: this error corresponds to the error in resource decoding using the expanded AICH space given that an AI bit was transmitted in the E-AICH signature space.

The received signal (after correlation with the designated AICH signature) in part 1 AICH can be represented by the following equations, depending on whether there is signal or not:

$$H_1: r = s + n$$

$$H_0: r = s$$

where $n \sim N(0, \sigma_{part1}^2)$. Assume that part 1 signal has power $\alpha \cdot Ec$, and part 2 signal has power $(1-\alpha) \cdot Ec$. The UE can produce an error in part 1 if the received signal falls to the wrong side of decision thresholds. Define the following error events of part 1:

$$FAR = P(\text{false alarm}) = P(\hat{H} = H_1 | H_0)$$

$$MDR = P(\text{miss detection}) = P(\hat{H} = H_0 | H_1)$$

For a targeted false alarm rate, $FAR_{target}$, one can show that the corresponding DTX thresholds are:

$$\eta = \pm Q^{-1}\left(\frac{FAR}{2}\right) \cdot \sigma_{part1}$$
$$= \pm \sqrt{2} \cdot \text{erfc}^{-1}(FAR) \cdot \sigma_{part1}$$

The resulting part 1 detection error given that a signal is transmitted can be written as:

$$Perr(part1 | H_1) = Q\left(\frac{|s| - |\eta|}{\sigma_{part1}}\right)$$
$$= \frac{1}{2} \cdot \text{erfc}\left[\sqrt{\frac{\alpha \cdot Ec}{\sigma_{part1}^2}} - \text{erfc}^{-1}(FAR)\right]$$

The received signal (after correlation with the E-AICH signatures in the expanded space) in part 2 AICH can be represented by the following equations, assuming there is signal +1 transmitted on the first signature in the expanded space:

$$r_1 = s + n_1$$
$$r_2 = n_2$$
$$\vdots$$
$$r_L = n_L$$

where L=#resources/2, and $n_i \sim N(0, \sigma_{part2}^2)$ are i.i.d. random variables.

Note the UE can produce an error in part 2 if $r_1$ is negative or if $r_1$ does not have the largest magnitude. Therefore, the part 2 error can have the following probability:

$$P(part2\,error) = 1 - P(r_1 > \max\{|r_2|, |r_3|, \ldots, |r_L|\})$$
$$= 1 - \int_{x=\sqrt{\frac{(1-\alpha) \cdot Ec}{\sigma_{part2}^2}}}^{\infty} f_n(x) \cdot \left[\text{erf}\left(\frac{x}{\sqrt{2}} + \sqrt{\frac{(1-\alpha) \cdot Ec}{\sigma_{part2}^2}}\right)\right]^{L-1} dx$$

where $$f_n(x) = \frac{1}{\sqrt{2\pi}} e^{-\frac{x^2}{2}}$$

is the pdf of a standard normal random variable.

At 220 of FIG. 2, the design criterion for selecting the optimal $\alpha$ should attempt at minimizing the overall error from part 1 and part 2 of the AICH signals. Note that noise components from part 1 and part 2 are actually independent in the case of AWGN, the total error is the sum of errors from the parts. An optimal criteria for selecting an $\alpha$ and Ec/Ior (carrier to interference ratio) (on combined AICH and E-AICH) in general can be dependent on a combination of the error probabilities on part 1 (AICH) and part 2 (E-AICH) for a given false alarm target on part 1 (AICH). Before discussing different optimization criteria, it would be useful to understand the impact of errors made on part 1 (AICH) compared to the errors made on part 2 (E-AICH):

The following types of error can be made on AICH when a bit was transmitted on AICH:

AICH Type 1: A +1 was sent and a DTX was received on AICH
  In the case, the UE assumes that the NodeB did not detect the access preamble, and continues with the remainder of the physical random access procedure, while the NodeB determines that an E-DCH resource is allocated.
  In other words, the E-DCH resource may be wasted. After the collision resolution period or even earlier, the NodeB may decide to release the E-DCH resource.

AICH Type 2: A +1 was sent and a −1 was received on AICH
  This event should occur less often compared to the Type 1 error. However, when it occurs, it could be serious.
  The UE infers from the −1, that its default E-DCH resource is blocked and monitors the E-AICH for an alternate E-DCH resource. If the UE detects an E-DCH resource (not ACK, or an erasure) on the E-AICH, then it retrieves the wrong E-DCH resource.
  In other words, not only can the default E-DCH resource be wasted, but the UE consumes an unallocated E-DCH resource on the uplink, without the NodeB being aware. This could also lead to collision with an already existing transmission or a future transmission that utilizes the same E-DCH resource.

AICH Type 3: A −1 was sent and a DTX was received on AICH
  This is similar to AICH Type 1.

AICH Type 4: A −1 was sent and a +1 was received on AICH
  This is similar to AICH Type 2.
  In this case, the UE retrieves the occupied default resource, while the NodeB has allocated the UE another E-DCH resource. The consequence can be similar to AICH Type 2, except that in this case, there is a likely chance of collision, since the default E-DCH resource was allocated.

The following types of error can be made on E-AICH when a −1 was correctly received on AICH:

E-AICH Type 1: The UE detects NACK (one of the 32 values sent on E-AICH is reserved as NACK) or an erasure when an E-DCH resource was signaled on E-AICH.
  This is similar to AICH Type 1.
  In this case, the UE reacts to the NACK and continues with the remainder of the physical random access procedure, while the NodeB determines that an E-DCH resource is allocated.
  In other words, the E-DCH resource can be wasted. After the collision resolution period or earlier, the NodeB may decide to release the E-DCH resource.

E-AICH Type 2: The UE detects a different E-DCH resource from the one that was signaled on the E-AICH.
  This is an error similar to AICH Type 2 or AICH Type 4.
  Note that the allocated E-DCH resource can be wasted, but the UE consumes an unallocated E-DCH resource on the uplink, without the NodeB aware. This could also lead to collision with an existing transmission or a future transmission that utilizes the same E-DCH resource.

As noted above, AICH Type 2, AICH Type 4 and E-AICH Type 2 errors can be more detrimental to the system compared to AICH Type 1, AICH Type 3 and E-AICH Type 1. Furthermore based on the link analysis, it is noted that AICH Type 2 and AICH Type 4, occur less often compared to AICH Type 1 and AICH Type 3. Also AICH Type 1 is about as likely as AICH Type 3. With regard to E-AICH error performance, it is difficult to predict how often E-AICH Type 1 occurs compared to E-AICH Type 2. However, in the presence of erasure logic, one would expect E-AICH Type 2 to be the predominant error when an error occurs on E-AICH.

Turning to FIG. 3, example optimization criteria 300 are illustrated. Based on the above description in FIG. 2, the optimal criteria for choosing an a and Ec/Ior (on combined AICH and E-AICH) can be more heavily biased towards E-AICH Type 2 errors. In the following description, 2 possible optimal criteria are described but others are possible:

At 310 of FIG. 3, one possible optimal approach could be to minimize a cost function equal to the weighted sum of the AICH Type 1, AICH Type 3 and E-AICH Type 2 error probabilities as a function of α and Ec/Tor (e.g., joint optimization problem), thus: Minimize across α and Ec/Tor, the following cost function:

$$v_1 * P_{e\text{-}aich,2} + v_2 * P_{aich,1} + v_3 * P_{aich,3}$$

Note that $P_{aich,1} = P_{aich,3} = P_{aich}$ and hence one can re-write the above cost function as $$w_1 * P_{e\text{-}aich,2} + w_2 * P_{aich}$$

At 320 of FIG. 3, another example optimal approach could be to achieve the following: Select a such that Ec/Ior (across AICH and E-AICH) is minimized subject to the following constraints: $P_{aich} \leq T_1$; $P_{e\text{-}aich} \leq T_2$; as can be appreciated, other constraints or thresholds could be selected.

Referring to FIG. 4, example optimization processes are described using various parameters. Before describing the optimization of FIG. 4, briefly refer to FIGS. 16-21 which illustrate example probably plots for possible errors under analysis. Based on analytic formulas for the probability of error of part 1 (AICH bit) and part 2 (E-AICH bit), FIGS. 16-21 plot a numerical computation of these formulas (FIGS. 16-21), as a function of the fraction a of the total (AICH+E-AICH) power allocated to the AICH bit. The error probabilities can be computed for the following scenario:

AWGN
8, 16, 32 E-DCH resources
Geometry=0 dB
Total (AICH+E-AICH) Ec/Ior=−22 dB
Target FAR on AICH bit=1%, 10%
α varies from 0.3 to 0.7 in steps of 0.05

Referring back to FIG. 4, three differing optimal processes are described. At 410 of FIG. 4, an Optimal Approach is provided where: $w_1 = w_2 = 1$ This corresponds to the case when AICH Type 1/3 and E-AICH Type 2 errors are considered about equally important. As noted above, there may be a more serious consequence due to E-AICH Type 2 errors compared to AICH Type 1/3 errors and hence it may not be desirable to set as the operating point of the system. Nevertheless, the resulting α due to the following criterion is considered: As seen in FIGS. 16 through 21, as α varies from 0.3 to 0.7, the error rate on part 1 (AICH bit) decreases while the error rate on part 2 (E-AICH bit) increases. Table 1 and Table 2 summarizes an optimal a and the resulting error rate for Target FAR=1% and Target FAR=10%, respectively.

TABLE 1

Optimal α, Target FAR = 1%, Total Ec/Ior = −22 dB,
G = 0 dB, AWGN

| Number of E-DCH Resources | Optimal α | Weighted error rate at Optimal α | Weighted error rate at α = 0.5 |
|---|---|---|---|
| 8 | 0.55 | 3e−3 | 4e−3 |
| 16 | 0.5 | 5e−3 | 5e−3 |
| 32 | 0.5 | 7e−3 | 7e−3 |

TABLE 2

Optimal α, Target FAR = 10%, Total Ec/Ior = −22 dB,
G = 0 dB, AWGN

| Number of E-DCH Resources | Optimal α | Weighted error rate at Optimal α | Weighted error rate at α = 0.5 |
|---|---|---|---|
| 8 | 0.45 | 7e−4 | 1e−3 |
| 16 | 0.5 | 1e−3 | 1e−3 |
| 32 | 0.5 | 2e−3 | 2e−3 |

Based on the above observations, for this criterion, the choice of α=0.5 is suitable, since there is not much loss in total error compared to the optimal α. If the resulting total error rate above is not acceptable, then boost the total Ec/Ior (across AICH and E-AICH) and re-perform the above process.

At 420 of FIG. 4, another Optimal Approach considers: $w_1=0.9$; $w_2=0.1$

TABLE 3

Optimal α, Target FAR = 1%, Total Ec/Ior = −22 dB,
G = 0 dB, AWGN

| Number of E-DCH Resources | Optimal α | Weighted error rate at Optimal α | Weighted error rate at α = 0.5 |
|---|---|---|---|
| 8 | 0.45 | 1e−3 | 1e−3 |
| 16 | 0.45 | 1.8e−3 | 2e−3 |
| 32 | 0.4 | 2.5e−3 | 4e−3 |

TABLE 4

Optimal α, Target FAR = 10%, Total Ec/Ior = −22 dB,
G = 0 dB, AWGN

| Number of E-DCH Resources | Optimal α | Weighted error rate at Optimal α | Weighted error rate at α = 0.5 |
|---|---|---|---|
| 8 | 0.35 | 3e−4 | 1e−3 |
| 16 | 0.35 | 4e−4 | 1e−3 |
| 32 | 0.3 | 6e−4 | 5e−3 |

As observed from the above observations, for this criterion (0.1, 0.9), for target FAR=1%, there is not much loss in error performance, when α=0.5 is selected. However, for target FAR=10%, a difference in performance may be observed when α=0.5 instead of the optimal α. In particular, when the system is configured for 32 E-DCH resources, an order of magnitude in weighted error performance may be observed.

Figure 16:
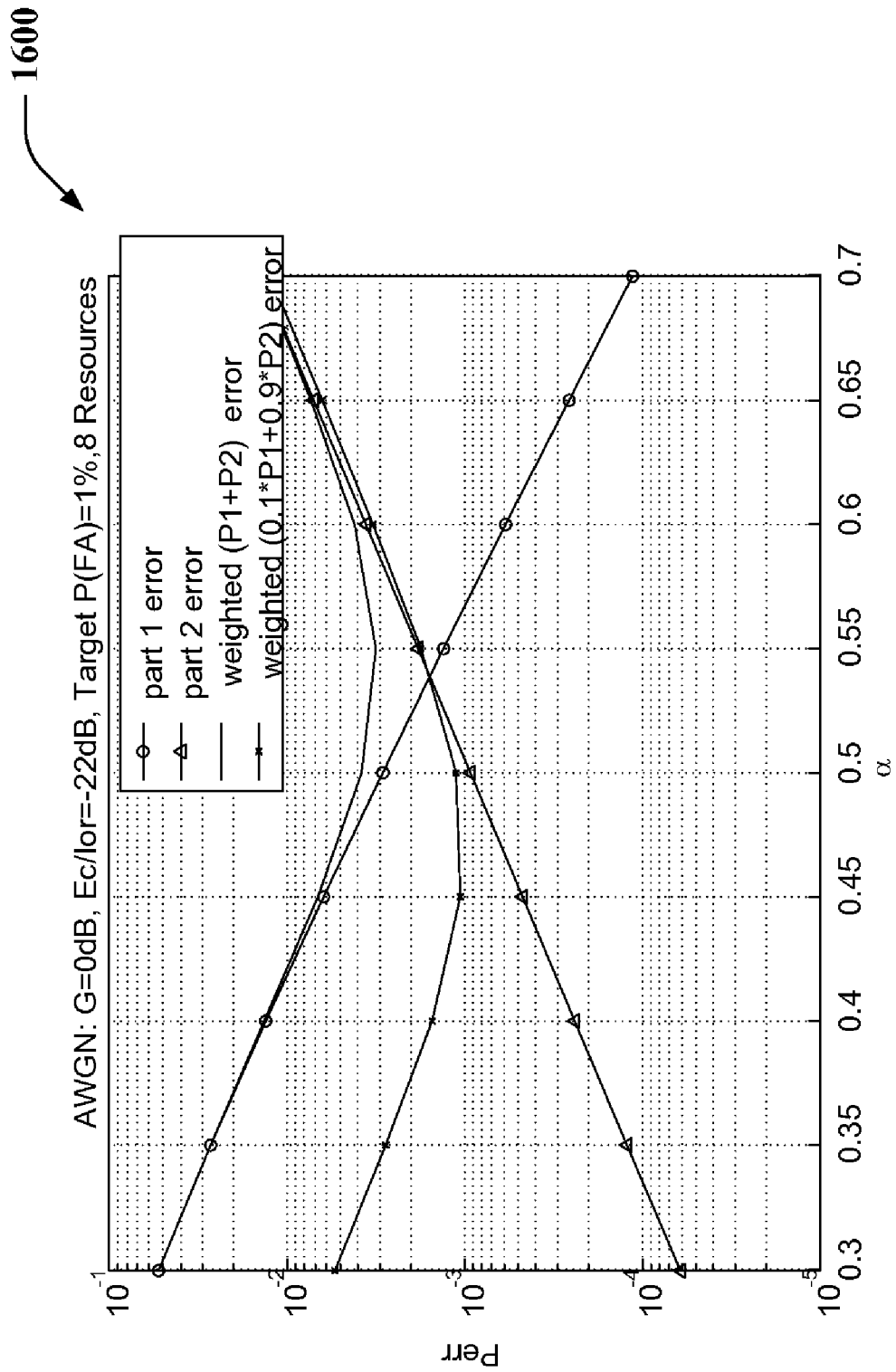
FIGS. 16-21 illustrate example error data based upon selected power parameters.
Figure 17:
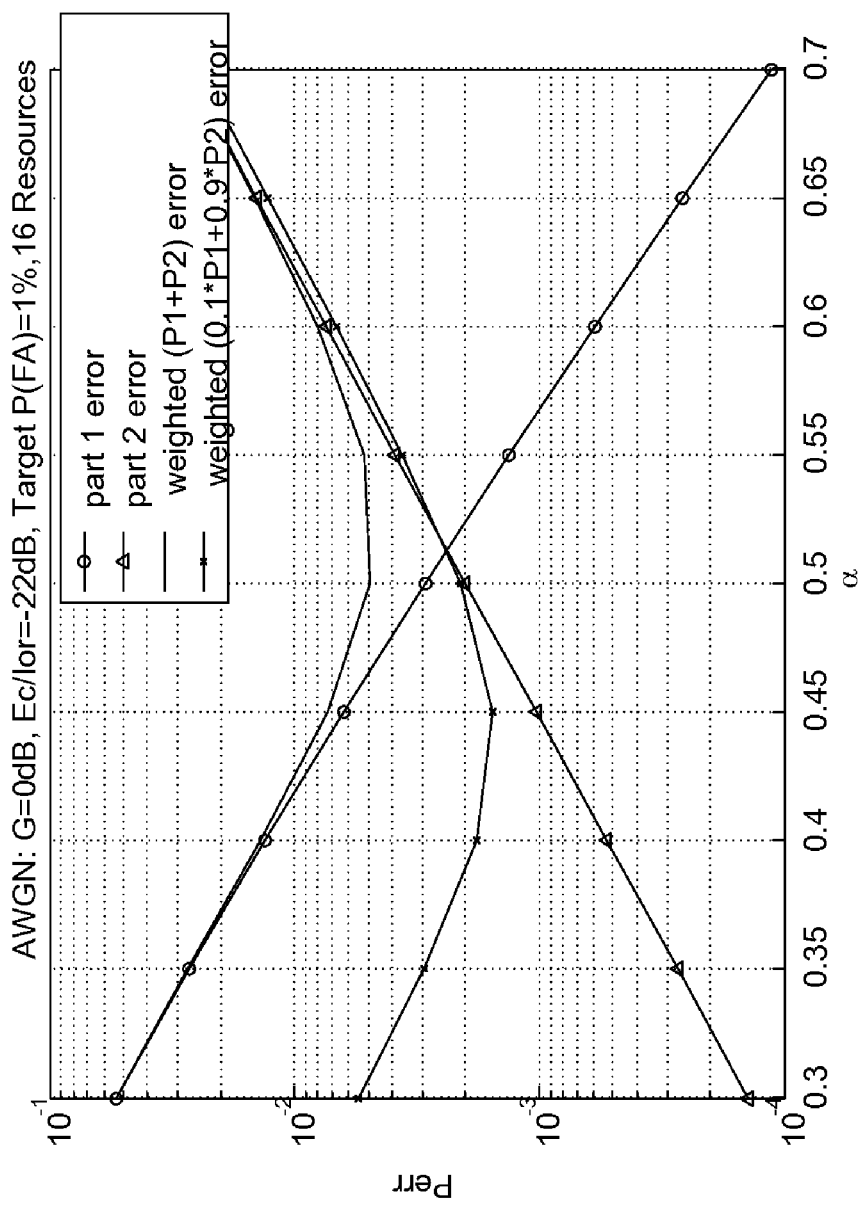
Figure 18:
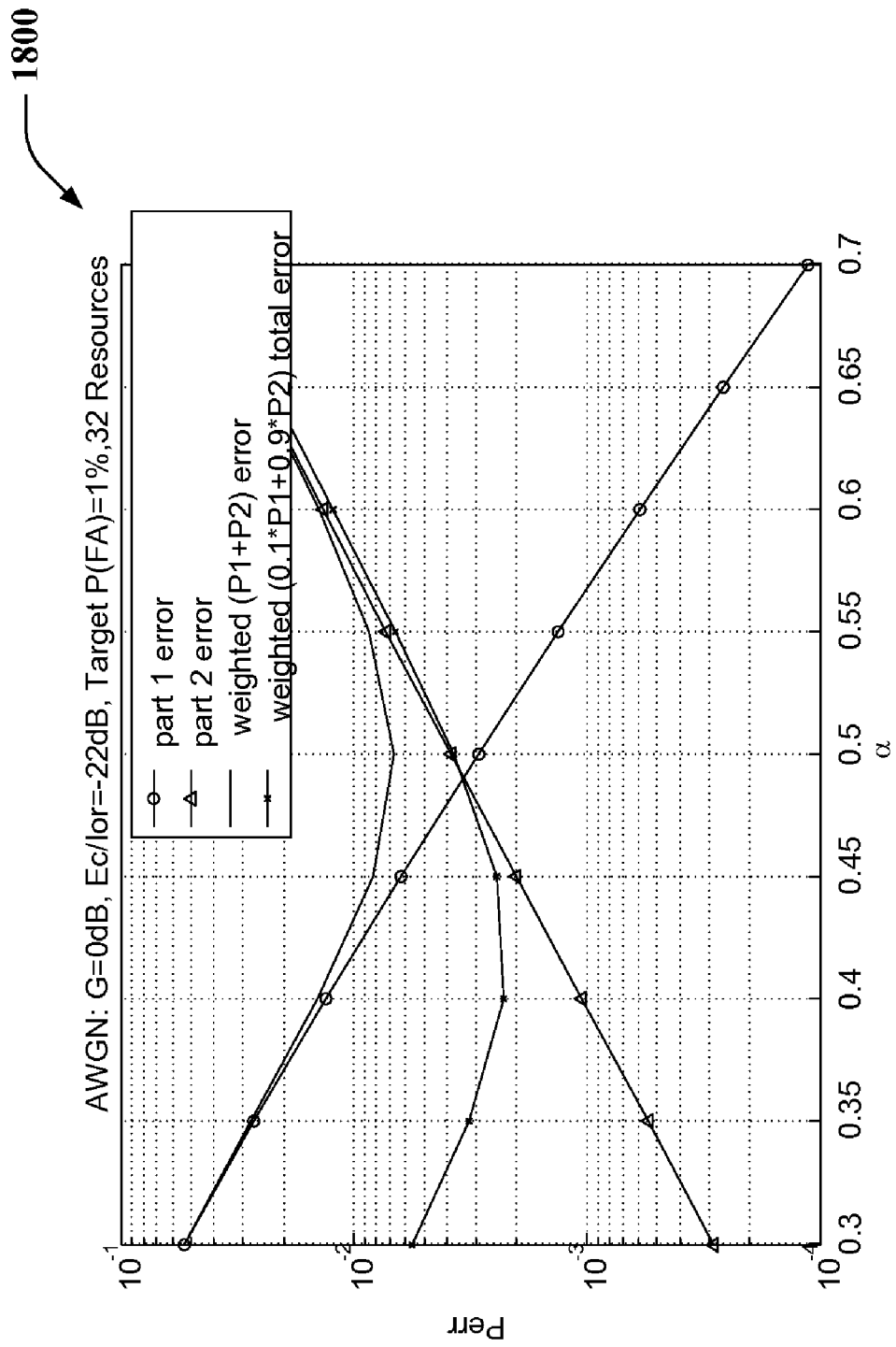
Figure 19:
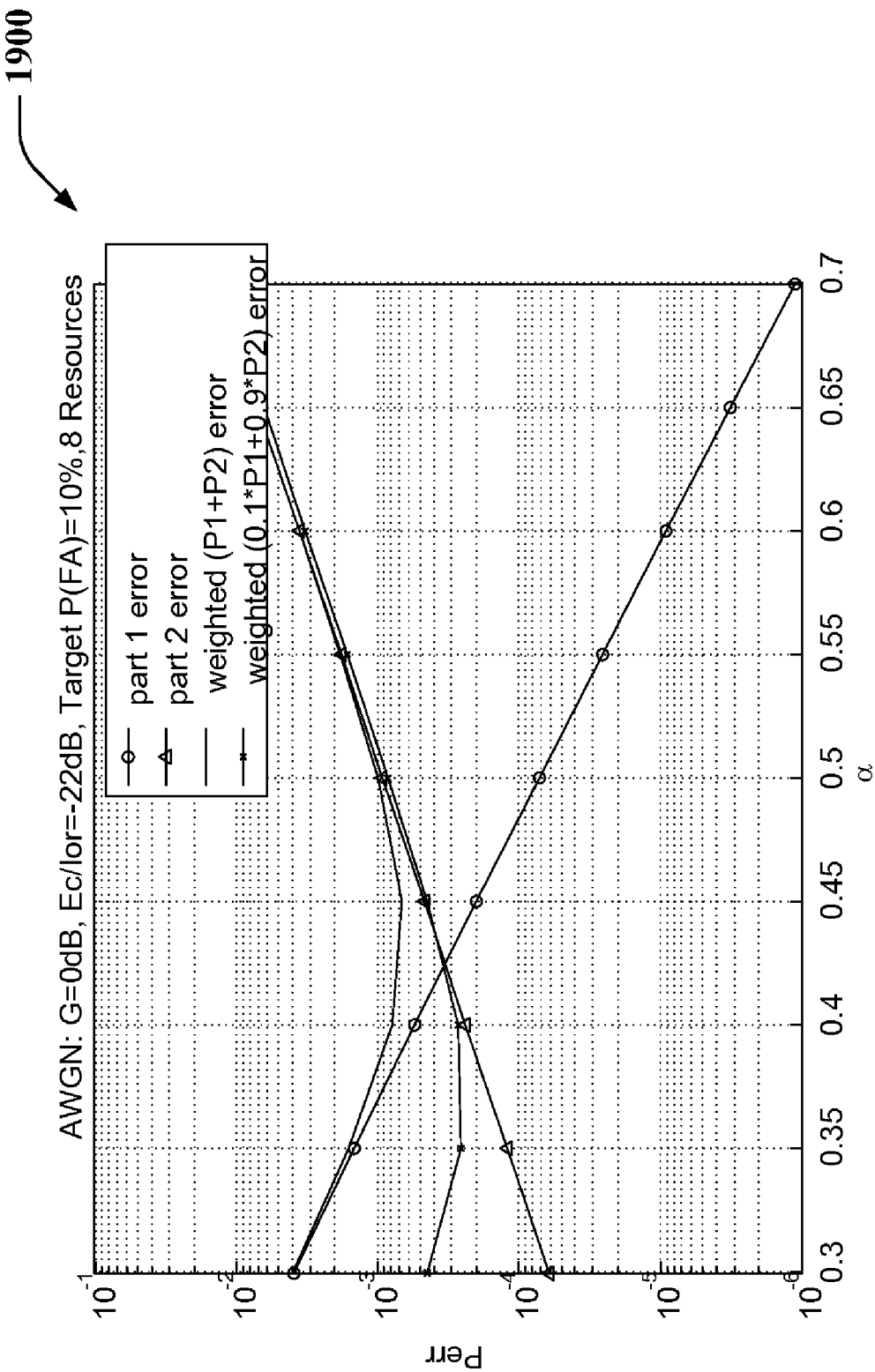
Figure 20:
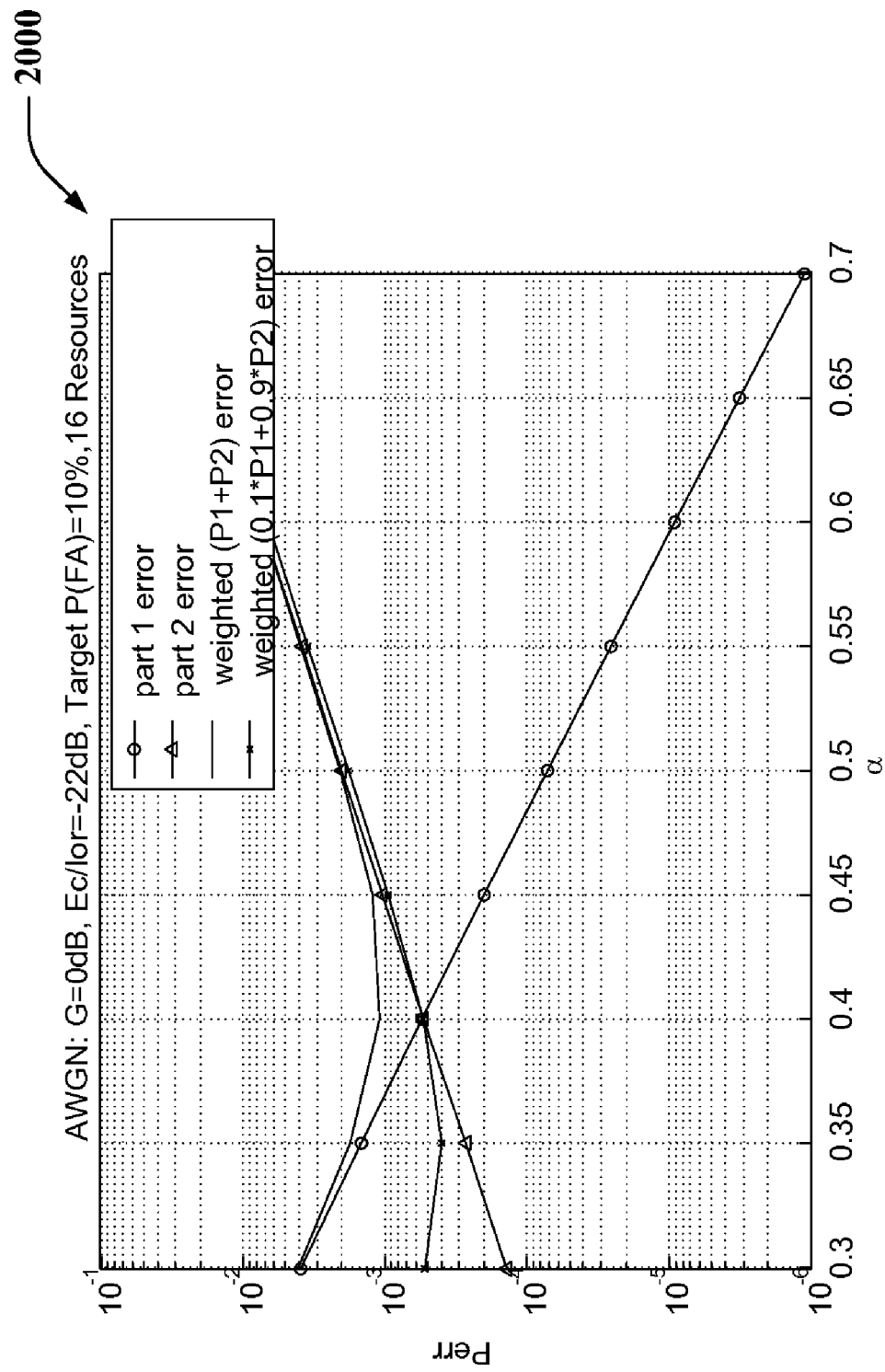
Figure 21:
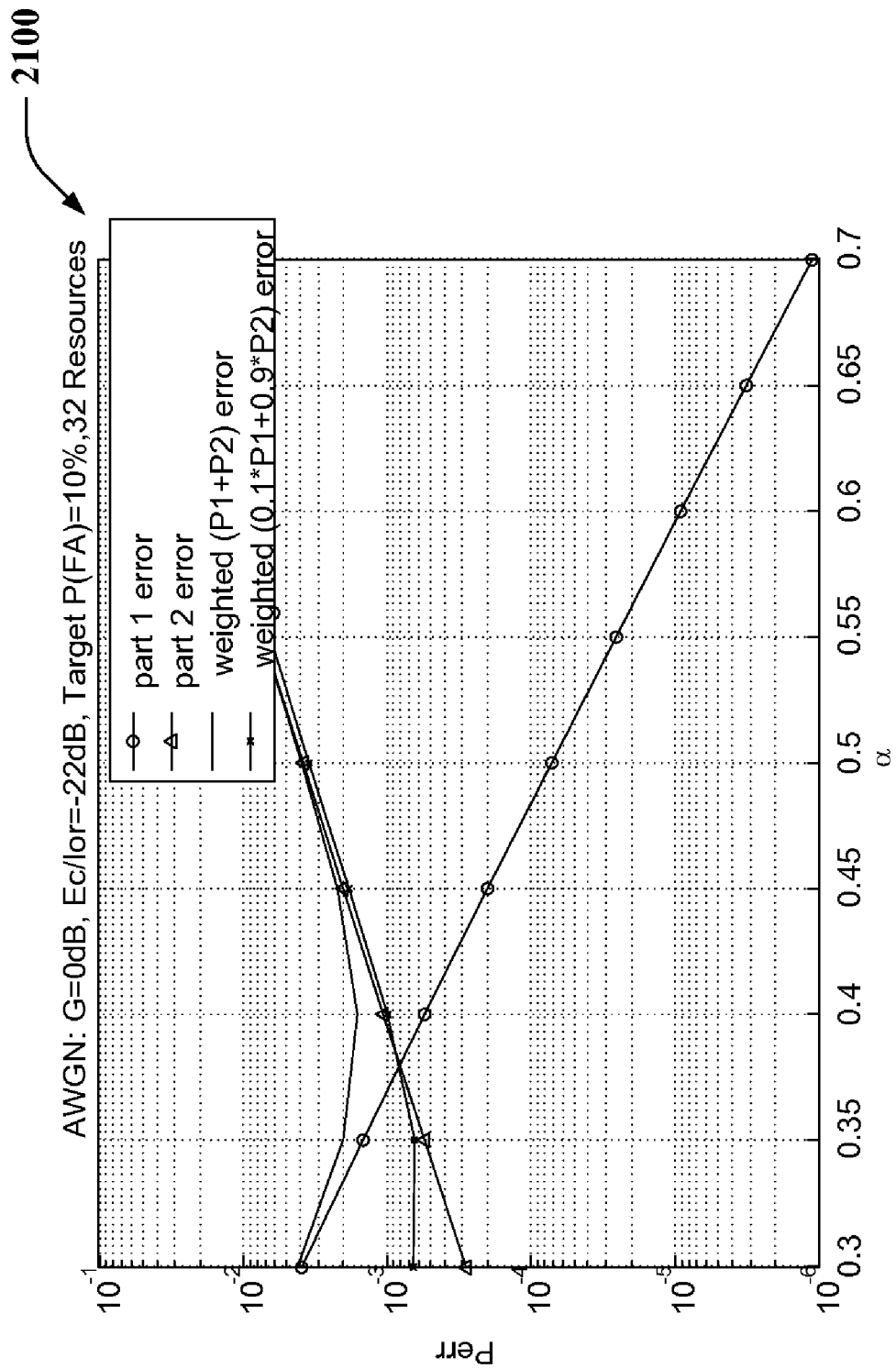

At 430 of FIG. 4, another Optimal Approach can be provided. In order to optimize α and total Ec/Ior using this approach, a family of curves can be employed such as FIGS. 16 through 21 for different Ec/Ior. In FIG. 16, the following may be desired $T_1=1e-2$; $T_2=5e--4$. In that case, a suitable α=0.4. One could also ask what would happen if boosting the total Ec/Ior and still use α=0.5. For example in FIG. 21, if $T_1=1e-2$; $T_2=1e-5$ using Optimal Approach 430. In that case, observe that the optimal α=0.6. Thus, if boosting Ec/Ior and using α=0.5, the following equation is satisfied:

$$(Ec/Ior)_1 * \alpha_1 = (Ec/Ior)_2 * \alpha_2$$

If we insert $\alpha_1=0.5$ and $\alpha_2=0.6$, we obtain $(Ec/Ior)_1=(0.6/0.5)*(Ec/Ior)_2$, which implies that there is a loss in Ec/Ior of 0.79 dB.

The error performance of the AICH/E-AICH E-DCH Resource Allocation can be analyzed based on analytic derivation of AICH and E-AICH errors in AWGN. It is noted that E-AICH Type 2 error should be kept as low as possible due to its detrimental effect on overall system performance. Various processes were provided to optimize the fraction of power α allocated on the AICH and the remaining power (1−α), allocated on the E-AICH, as well as the total Ec/Ior (across AICH and E-AICH). In most of the cases, a setting of α=0.5 was suitable and did not result in significant loss in performance. However, for Optimal Approach (w1=0.1; w2=0.9) and target FAR=10%, a sensitivity in error performance was observed when α=0.5 was selected instead of the optimal α. Also, for Optimal Approach at 430 of FIG. 4, a loss of ~0.8 dB in Ec/Ior requirement was observed when α=0.5 was selected instead of the optimal α for a desired E-AICH error rate=5e−4 and a desired AICH error rate=1e−2. When both AICH and E-AICH are transmitted concurrently, a flexible and dynamically adjustable power setting is thus provided on the AICH and E-AICH bits as described above with respect to FIG. 1.

Figure 5:
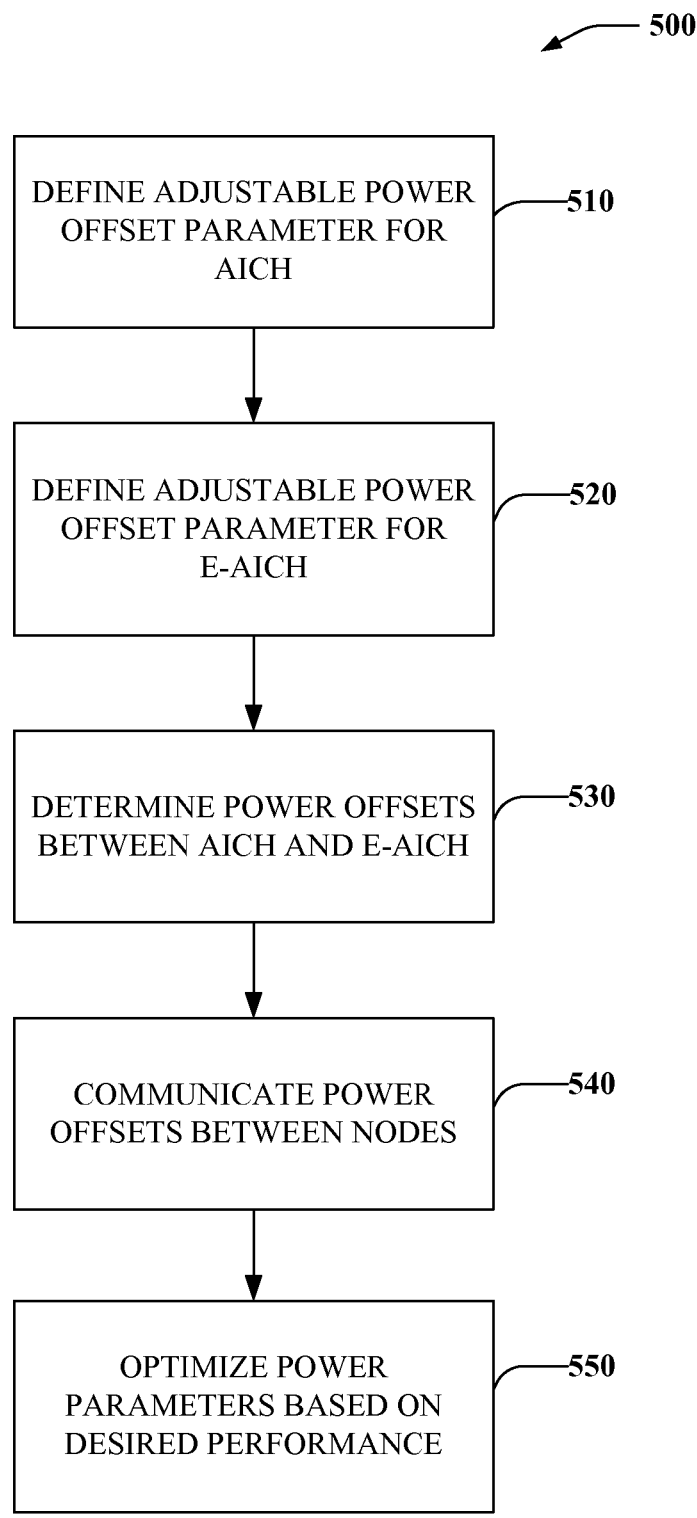
FIG. 5 illustrates a wireless communications method for generating adjustable power offset parameters.

Referring now to FIG. 5, a wireless communications methodology 500 is illustrated. While, for purposes of simplicity of explanation, the methodology (and other methodologies described herein) are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Proceeding to 510, an adjustable power offset parameter is defined for an AICH component as was previously described above. Similarly at 520, an adjustable power offset parameter is defined for an E-AICH component as was previously described above. At 530, power offset differences are determined between the AICH and E-AICH respectively. Such differences can be reflected in the parameters provided at 510 and 520 to describe power discrepancies or differences between the respective channels. At 540, the power offsets are communicated to one or more nodes on a wireless network such as to a base station and/or user equipment, for example. As noted previously, the power offsets for the AICH and/or the E-AICH can be communicated or generated by a radio network controller (RNC), for example. At 550, power parameters can be optimized based on the processes/methods previously described above with respect to FIGS. 2-4. Such optimizations can be employed to dynamically adjust the offset parameters defined at 510 and 520.

The techniques described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 6:
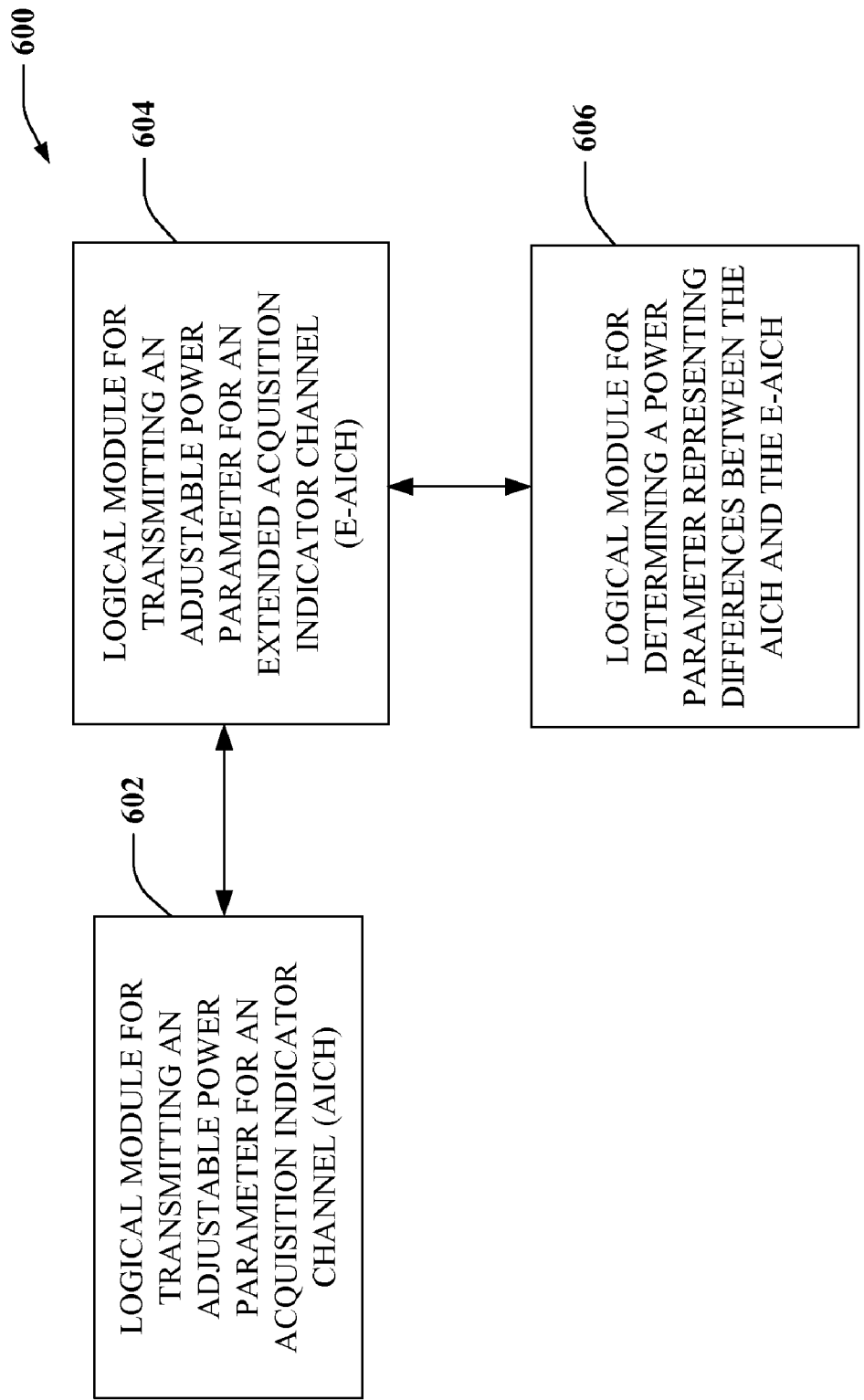
FIG. 6 illustrates an example logical module for a wireless system.
Figure 7:
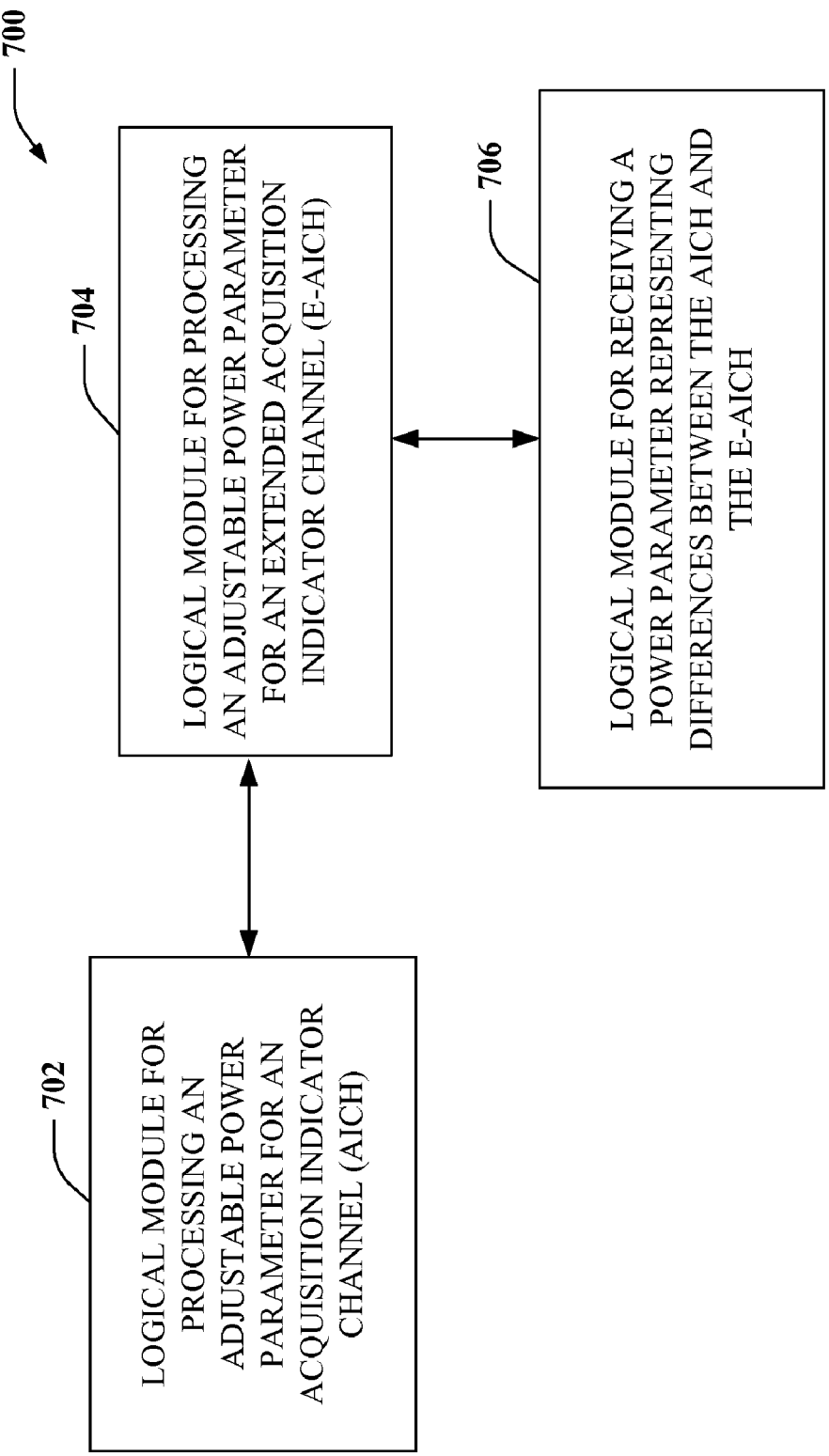
FIG. 7 illustrates an example logical module for an alternative wireless system.

Turning now to FIGS. 6 and 7, a system is provided that relates to wireless signal processing. The systems are represented as a series of interrelated functional blocks, which can represent functions implemented by a processor, software, hardware, firmware, or any suitable combination thereof.

Referring to FIG. 6, a wireless communication system 600 is provided. The system 600 includes a logical module 602 for transmitting an adjustable power parameter for an acquisition indicator channel (AICH). This includes a logical module 704 for transmitting an adjustable power parameter for an extended acquisition indicator channel (E-AICH). This also includes a logical module 706 for determining a power parameter representing differences between the AICH and the E-AICH.

Referring to FIG. 7, a wireless communication system 700 is provided. The system 700 includes a logical module 702 for processing an adjustable power parameter for an acquisition indicator channel (AICH) and a logical module 704 for processing an adjustable power parameter for an extended acquisition indicator channel (E-AICH). This also includes a logical module 706 for receiving a power parameter representing differences between the AICH and the E-AICH.

Figure 8:
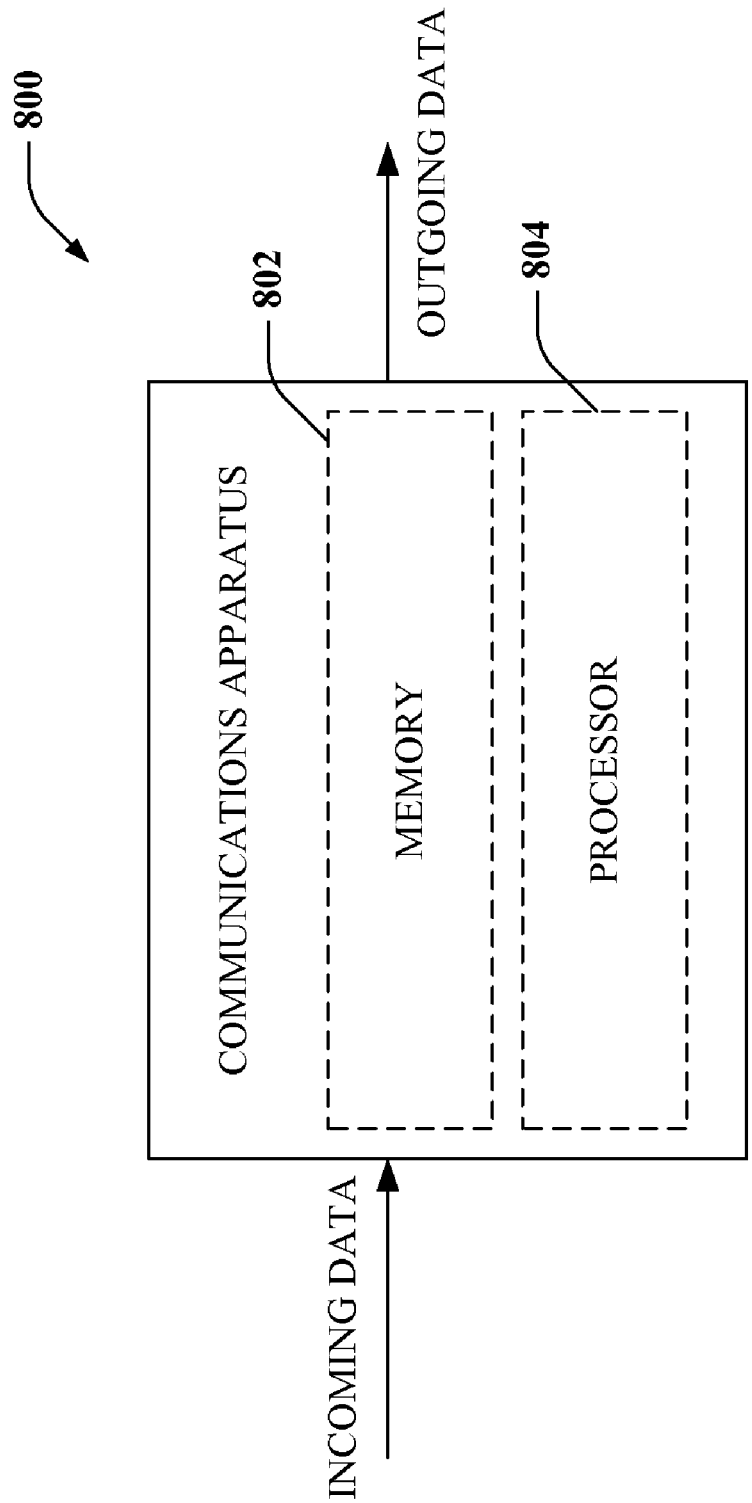
FIG. 8 illustrates an example communications apparatus for a wireless system.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
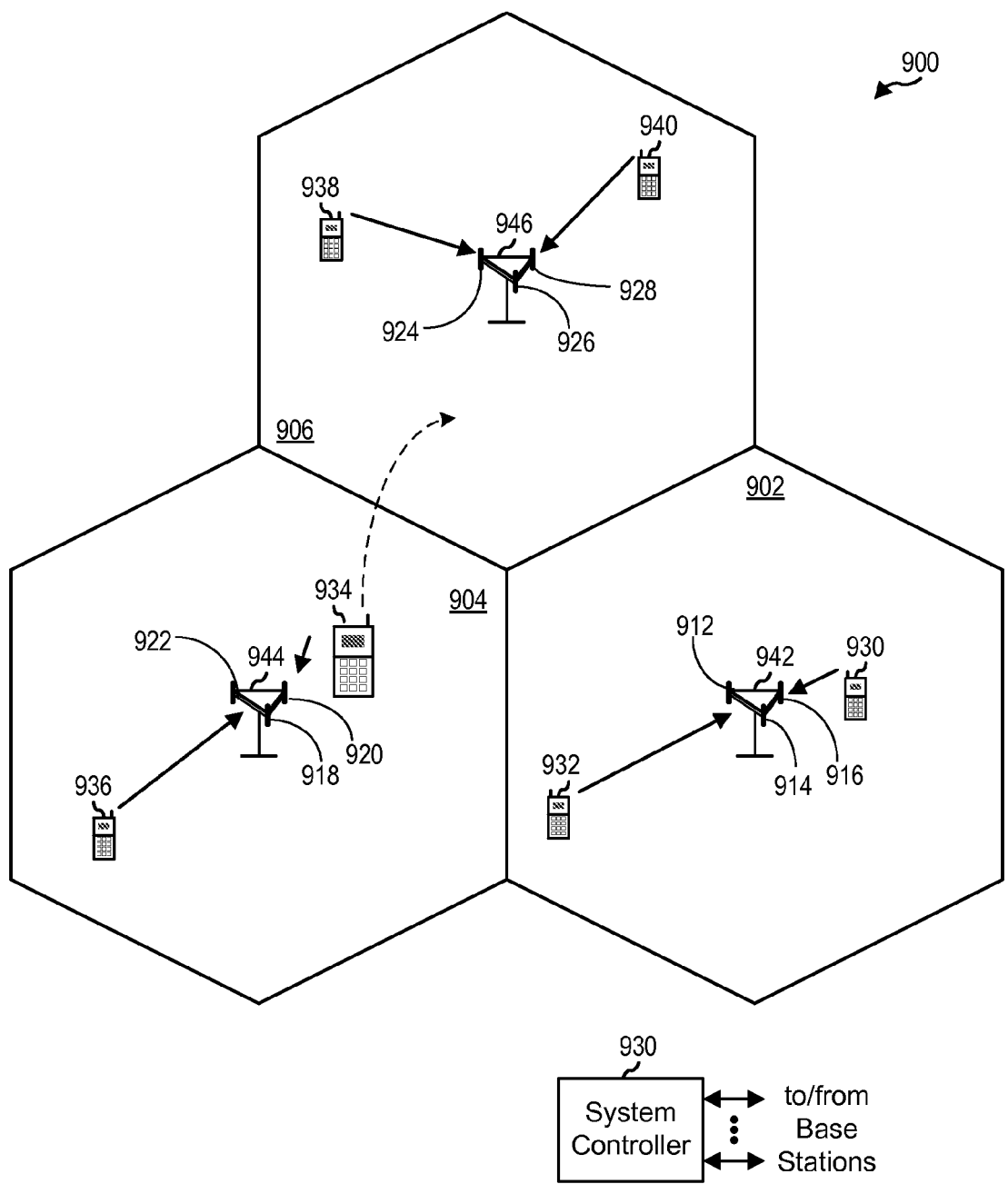
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
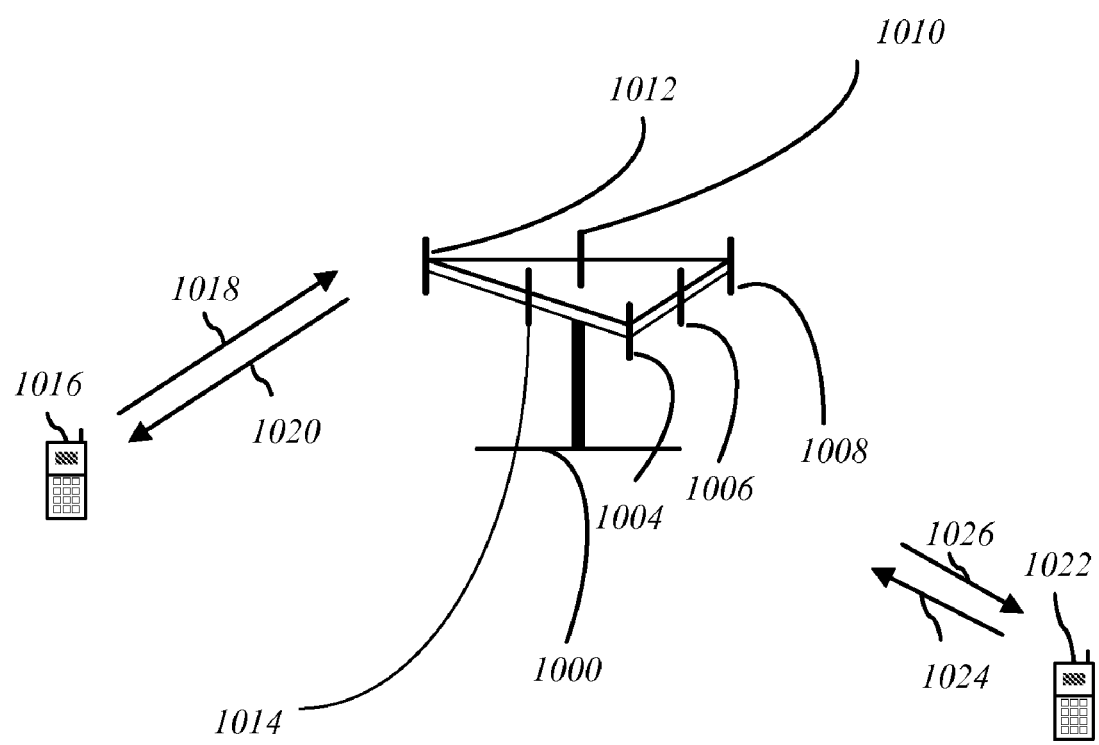
FIGS. 10 and 11 illustrate example communications systems.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
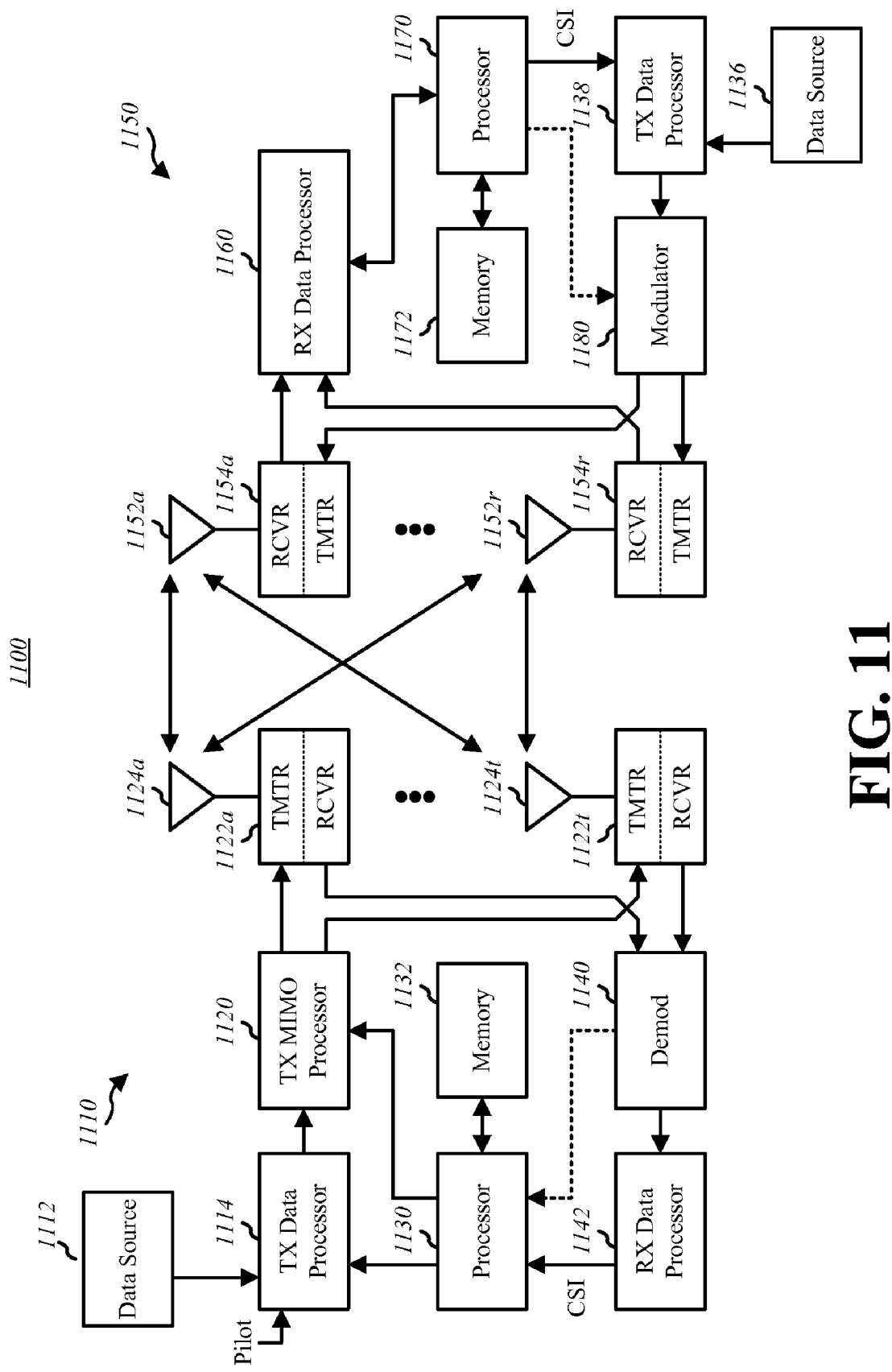

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and downconverts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

Figure 12:
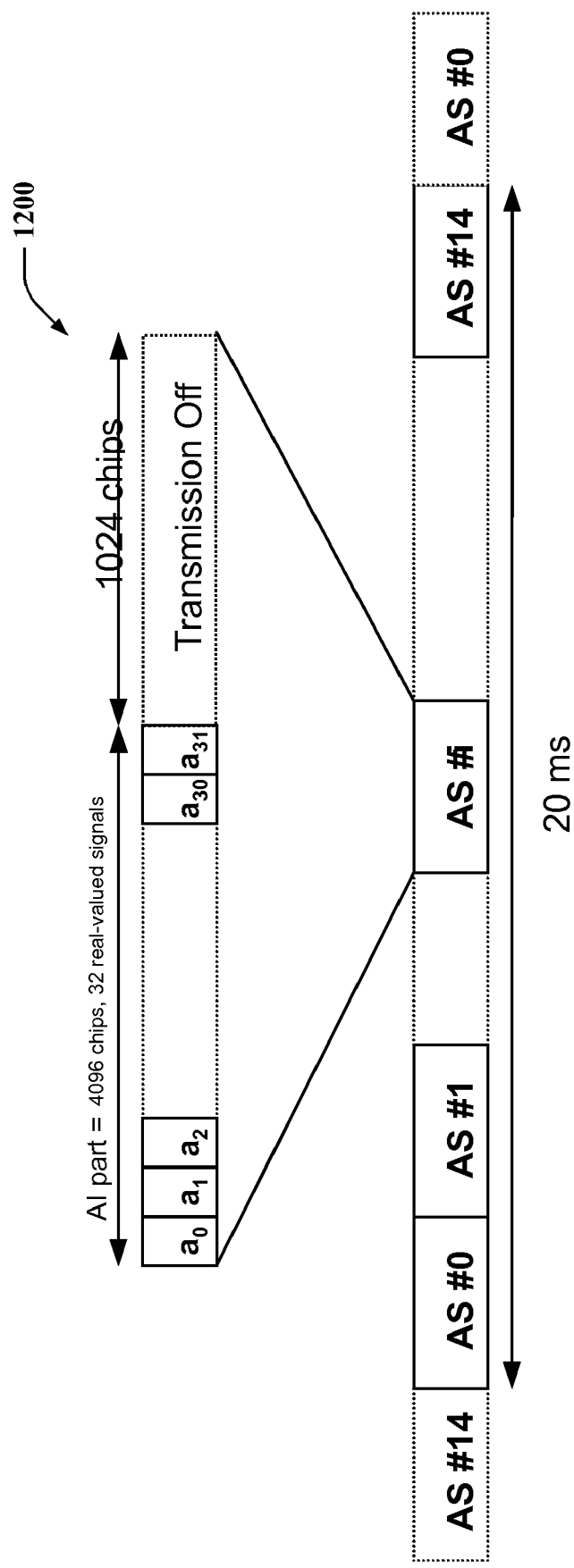
Figure 13:
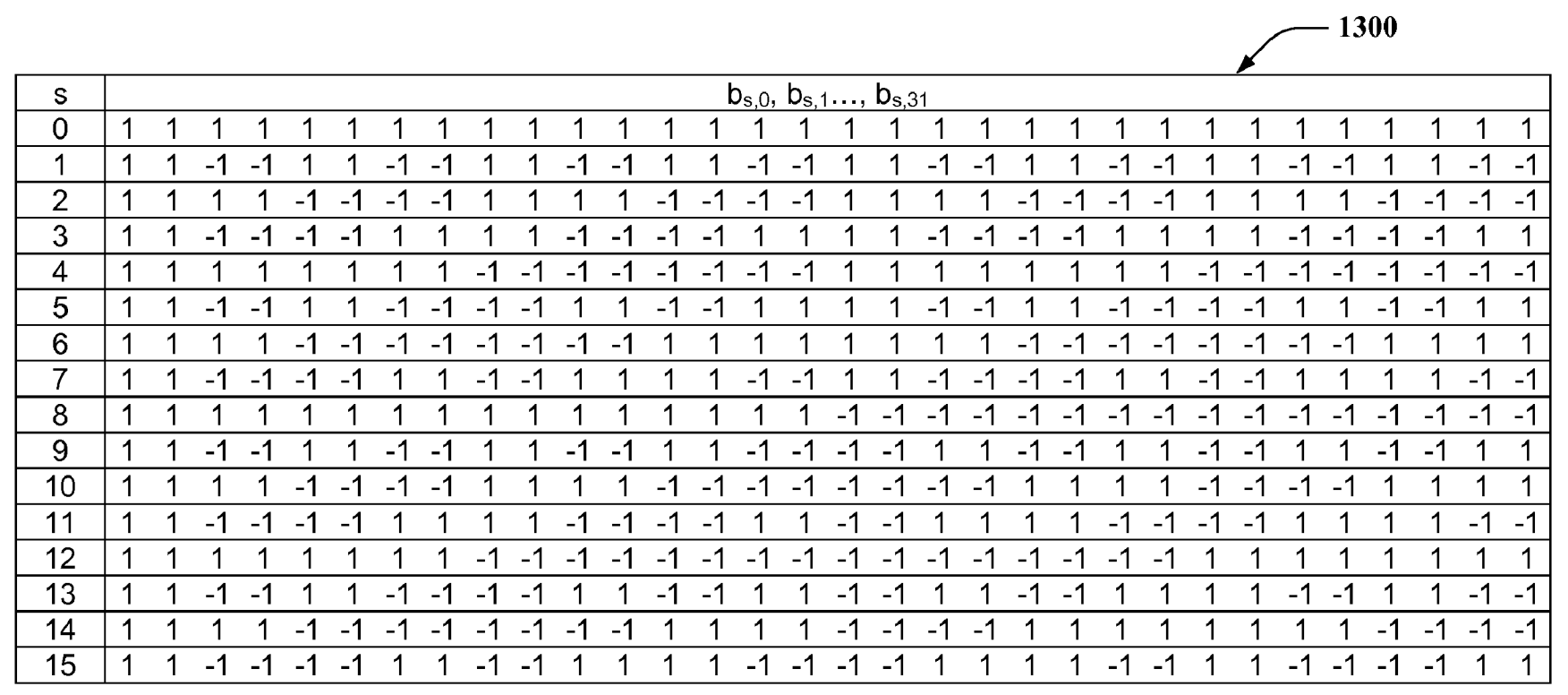

FIGS. 12-15 illustrate example AICH and E-AICH components. FIG. 12 illustrates an example structure for AICH. For instance, the AICH can include a repeated sequence of 15 consecutive access slots (AS), each of length 5120 chips. Each access slot can include two parts, an Acquisition-Indicator (AI) part consisting of 32 real-valued signals a0, . . . , a31 and a part of duration 1024 chips with no transmission that is not formally part of the AICH. The portion of the slot with no transmission is reserved for possible future use by other physical channels. FIG. 13 illustrates an example signature pattern for AICH.

Figure 14:
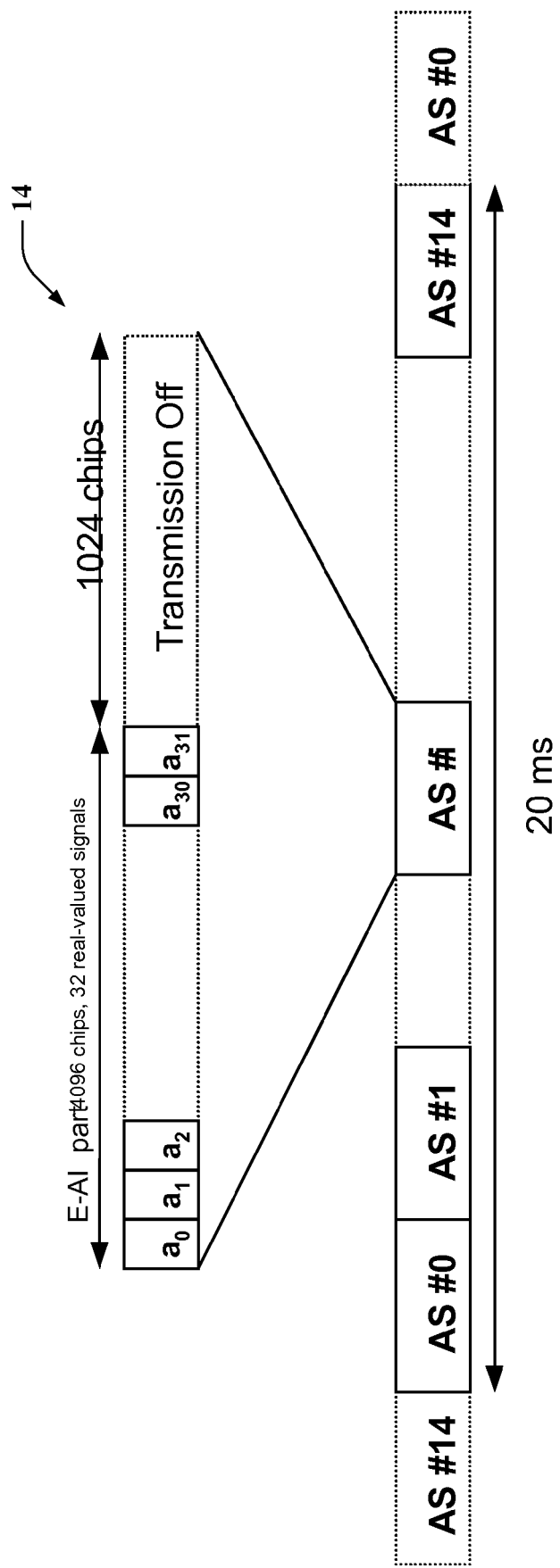
Figure 15:
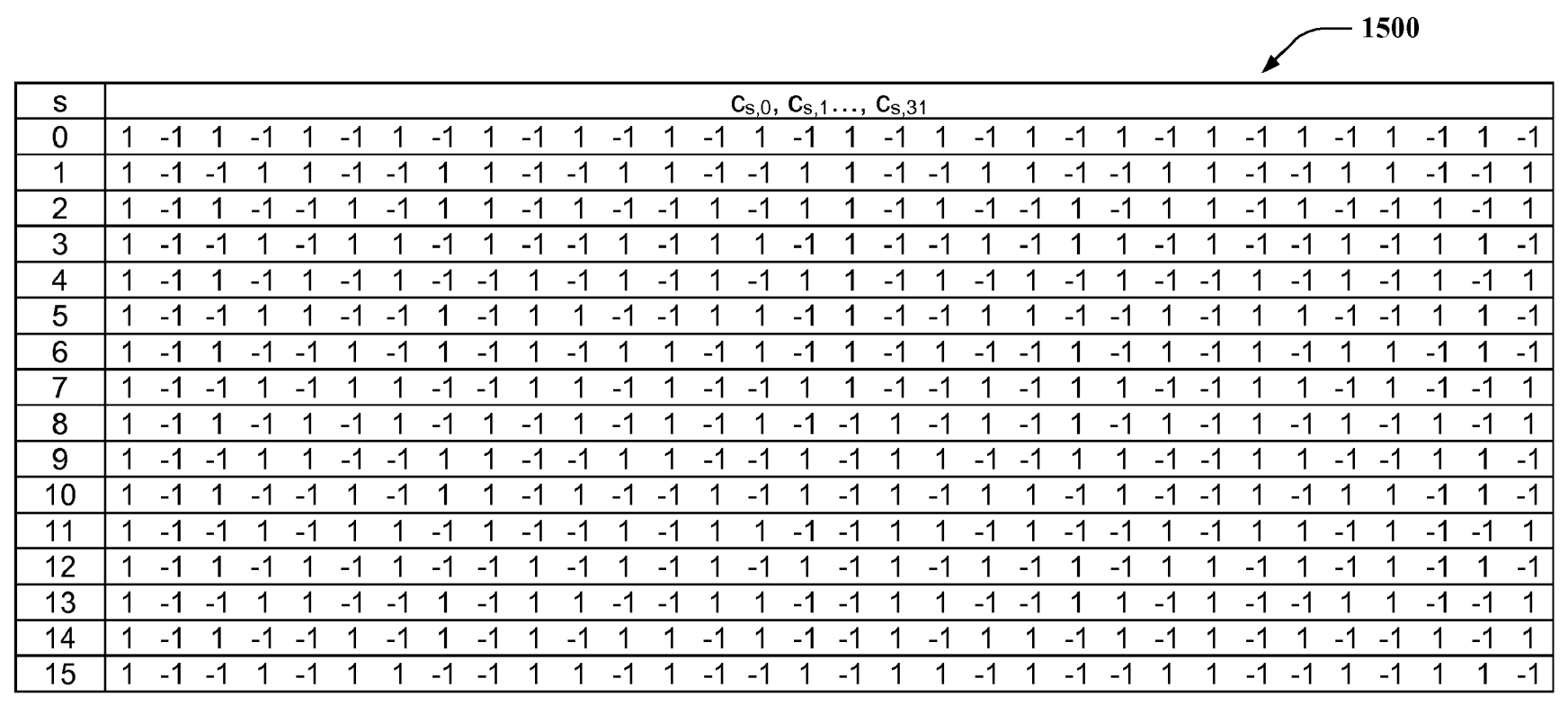

FIG. 14 illustrates an example structure for E-AICH. The E-AICH can include a repeated sequence of 15 consecutive access slots (AS), each of length 5120 chips. Each access slot can include two parts (or more), an Extended Acquisition-Indicator (E-AI) part consisting of 32 real-valued signals a0, . . . , a31 and a part of duration 1024 chips with no transmission that is not formally part of the E-AICH. The portion of the slot with no transmission can be reserved for possible future use by other physical channels. FIG. 15 illustrates an example signature pattern for E-AICH.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SD-CCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

As used in this application, the terms "component," "module," "system," "protocol," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for wireless communications, comprising:
  employing a processor executing computer executable instructions stored on a computer readable storage medium to implement the following acts:
  generating at least one adjustable power parameter for an acquisition indicator channel (AICH);
  generating at least one adjustable power parameter for an extended acquisition indicator channel (E-AICH); and
  generating at least one power offset representing differences between the AICH and the E-AICH,
  wherein the AICH and E-AICH identify an allocation of communication resources to one or more user equipments (UEs).

2. The method of claim 1, further comprising optimizing the power parameters based on desired network performance.

3. The method of claim 2, the network performance is based on a desired error total or alarm rate.

4. The method of claim 2, the optimizing is based on a fractional power allocation setting referred to as α which is set as a value between 0 and 1.

5. The method of claim 4, the optimizing is based on an Ec/Ior parameter which is a carrier to interference ratio.

6. The method of claim 2, the optimizing is based on minimizing a power allocation parameter or a carrier to interference ratio based on a cost function.

7. The method of claim 2, the optimizing is based on a power setting being less than or equal to a desired threshold constraint.

8. The method of claim 1, further comprising transmitting a randomly selected access preamble signature.

9. The method of claim 8, further comprising mapping the access preamble signatures to an extended dedicated channel (E-DCH) resource.

10. The method of claim 9, further comprising transmitting at least one of a plurality of signatures and employing an index to indicate the E-DCH resource.

11. The method of claim 9, further comprising transmitting a +1 or a −1 for associated E-AICH signatures.

12. The method of claim 11, further comprising correlating de-spread symbols with AICH signatures and selecting a correlator output with a largest magnitude.

13. The method of claim 1, further comprising performing a power optimization based upon a family of curves.

14. The method of claim 13, further comprising varying a number of resources across the family of curves.

15. The method of claim 14, further comprising varying a power allocation value across the family of curves.

16. A communications apparatus, comprising:
a memory that retains instructions for generating adjustable power parameters for an acquisition indicator channel (AICH), generating adjustable power parameter for an extended acquisition indicator channel (E-AICH), and determining at least one power offset representing differences between the AICH and the E-AICH, wherein the AICH and E-AICH identify an allocation of communication resources to one or more user equipments (UEs); and
a processor that executes the instructions.

17. The apparatus of claim 16, further comprising determining a power allocation parameter that is in the range of 0 and 1, where the allocation parameter is apportioned between the AICH and the E-AICH.

18. The apparatus of claim 17, the power allocation parameter is based on a desired error total or alarm rate.

19. The apparatus of claim 17, further comprising a component to process an Ec/Ior parameter which is a carrier to interference ratio.

20. The apparatus of claim 17, further comprising a component to minimize a power allocation parameter or a carrier to interference ratio based on a cost function.

21. A communications apparatus, comprising:
means for transmitting an adjustable power parameter for an acquisition indicator channel (AICH);
means for transmitting an adjustable power parameter for an extended acquisition indicator channel (E-AICH); and
means for determining a power parameter representing differences between the AICH and the E-AICH,
wherein the AICH and E-AICH identify an allocation of communication resources to one or more user equipments (UEs).

22. The apparatus of claim 21, further comprising a power allocation parameter that apportions power between the AICH and the E-AICH.

23. A non-transitory computer-readable medium, comprising:
transmitting an adjustable power parameter for an acquisition indicator channel (AICH);
processing an adjustable power parameter for an extended acquisition indicator channel (E-AICH); and
communicating a power offset between the AICH and the E-AICH to at least one node on a wireless network,
wherein the AICH and E-AICH identify an allocation of communication resources to one or more user equipments (UEs).

24. The non-transitory computer-readable medium of claim 23, further comprising determining the power offset based in part on a cost function.

25. A processor that executes the following instructions:
communicating an adjustable power parameter for an acquisition indicator channel (AICH);
determining an adjustable power parameter for an extended acquisition indicator channel (E-AICH); and
communicating a power offset between the AICH and the E-AICH across a wireless network,
wherein the AICH and E-AICH identify an allocation of communication resources to one or more user equipments (UEs).

26. The processor of claim 25, further comprising optimizing the power offset based in part on an error rate or an alarm total.

27. The processor of claim 26, further comprising optimizing the power offset based in part on a family of error performance curves.

28. A method for wireless communications, comprising:
employing a processor executing computer executable instructions stored on a computer readable storage medium to implement the following acts:
receiving at least one adjustable power parameter for an acquisition indicator channel (AICH);
processing at least one adjustable power parameter for an extended acquisition indicator channel (E-AICH); and
processing at least one power offset representing differences between the AICH and the E-AICH,
wherein the AICH and E-AICH identify an allocation of communication resources to one or more user equipments (UEs).

29. The method of claim 28, further comprising optimizing the power offset based on a fractional power allocation setting referred to as α which is set as a value between 0 and 1.

30. The method of claim 29, the optimizing is based on an Ec/Ior parameter which is a carrier to interference ratio.

31. The method of claim 29, the optimizing is based on minimizing a power allocation parameter or a carrier to interference ratio based on a cost function.

32. A communications apparatus, comprising:
a memory that retains instructions for processing adjustable power parameters for an acquisition indicator channel (AICH), processing adjustable power parameter for an extended acquisition indicator channel (E-AICH), and receiving a power offset parameter representing differences between the AICH and the E-AICH, wherein the AICH and E-AICH identify an allocation of communication resources to one or more user equipments (UEs); and
a processor that executes the instructions.

33. The apparatus of claim 32, further comprising processing a power allocation parameter that is in the range of 0 and 1, where the allocation parameter is apportioned between the AICH and the E-AICH.

34. The apparatus of claim 32, further comprising a component to minimize a power allocation parameter or a carrier to interference ratio based on a cost function.

35. A communications apparatus, comprising:
- means for processing an adjustable power parameter for an acquisition indicator channel (AICH);
- means for processing an adjustable power parameter for an extended acquisition indicator channel (E-AICH); and
- means for receiving a power parameter representing differences between the AICH and the E-AICH,
- wherein the AICH and E-AICH identify an allocation of communication resources to one or more user equipments (UEs).

36. The apparatus of claim 35, further comprising a power allocation parameter that apportions power between the AICH and the E-AICH.

37. A non-transitory computer-readable medium, comprising:
- receiving an adjustable power parameter for an acquisition indicator channel (AICH);
- receiving an adjustable power parameter for an extended acquisition indicator channel (E-AICH); and
- processing a power offset between the AICH and the E-AICH to at least one node on a wireless network,
- wherein the AICH and E-AICH identify an allocation of communication resources to one or more user equipments (UEs).

38. The non-transitory computer-readable medium of claim 37, further comprising determining the power offset based in part on a cost function.

39. A processor that executes the following instructions:
- receiving an adjustable power parameter for an acquisition indicator channel (AICH);
- receiving an adjustable power parameter for an extended acquisition indicator channel (E-AICH); and
- processing a power offset between the AICH and the E-AICH across a wireless network,
- wherein the AICH and E-AICH identify an allocation of communication resources to one or more user equipments (UEs).

40. The processor of claim 39, further comprising optimizing the power offset based in part on a family of error performance curves.

41. The method of claim 1, wherein the AICH and E-AICH are fixed rate physical channels configured to carry Acquisition Indicators (AIs).

42. The method of claim 41, wherein the AIs for the AICH correspond to signatures on a Physical Random Access Channel (PRACH).

43. The method of claim 41, wherein the AIs for the E-AICH correspond to signatures on an Enhanced Dedicated Channel (E-DCH).

* * * * *